(12) United States Patent
Balzarin et al.

(10) Patent No.: US 8,002,107 B2
(45) Date of Patent: Aug. 23, 2011

(54) APPARATUS FOR TRANSFERRING CONTAINERS

(75) Inventors: Franco Balzarin, Sarego (IT); Giuliano Boscaro, Castelgomberto (IT)

(73) Assignee: MBF S.p.A., Veronella (VR) (IT)

( * ) Notice: Subject to any disclaimer, the term of this patent is extended or adjusted under 35 U.S.C. 154(b) by 78 days.

(21) Appl. No.: 12/617,831

(22) Filed: Nov. 13, 2009

(65) Prior Publication Data

US 2011/0114454 A1  May 19, 2011

(30) Foreign Application Priority Data

Nov. 13, 2008  (IT) ............................. PD2008A0331

(51) Int. Cl.
*B65G 47/04* (2006.01)
(52) U.S. Cl. ................................. 198/478.1; 198/470.1
(58) Field of Classification Search ............... 198/474.1, 198/469.1, 470.1, 478.1, 476.1, 477.1
See application file for complete search history.

(56) References Cited

U.S. PATENT DOCUMENTS

| | | | |
|---|---|---|---|
| 5,607,045 A * | 3/1997 | Hermann Kronseder | 198/476.1 |
| 5,649,615 A * | 7/1997 | Oberdorf | 198/476.1 |
| 7,581,635 B2 * | 9/2009 | Lecomte | 198/474.1 |
| 2002/0092731 A1 * | 7/2002 | Osterfeld et al. | 198/470.1 |
| 2003/0034227 A1 * | 2/2003 | Gerber et al. | 198/473.1 |
| 2005/0011730 A1 * | 1/2005 | Wittmann et al. | 198/470.1 |
| 2008/0210520 A1 * | 9/2008 | Legallais | 198/470.1 |

FOREIGN PATENT DOCUMENTS

| | | |
|---|---|---|
| DE | 19903319 A1 | 8/1999 |
| FR | 910315 A | 6/1946 |
| JP | 59039614 A | 3/1984 |

\* cited by examiner

*Primary Examiner* — James R Bidwell
(74) *Attorney, Agent, or Firm* — Browdy and Neimark, PLLC

(57) ABSTRACT

Apparatus for transferring containers, comprising a first turntable (6) centrally fixed onto a first shaft (5) so as to rotate about a vertical axis (Z) and a plurality of first grippers (7) mounted peripherally on the first turntable (6). Each first gripper (7) is provided with at least two first arms (9) which can be actuated by a first actuator (12) so as to rotate about different first pins (10) with first parallel axes (Y, Y') between at least a first open position, where respective first retaining portions (13) of the first arms (9) are spaced from each other so as to receive or release a container (2), and at least one first closed position, where the first retaining portions (13) are close together so as to hold the container (2) between them. Each first arm (9) of each of the first grippers (7) is provided with a slot (15) aligned with the slot of at least one other first arm (9) of the same first gripper (7).

11 Claims, 25 Drawing Sheets

APPARATUS FOR TRANSFERRING CONTAINERS

FIELD OF APPLICATION

The present invention concerns an apparatus for transferring containers, in particular bottles or the like, according to the preamble of the main claim.

The apparatus in question is intended to be used advantageously in industrial plants for bottling beverages, such as wine or mineral water, for conveying the containers, made of glass or plastic, between different operating machines, such as rinsing machines, filling or corking/capping machines, or for conveying the containers inside the same machines.

BACKGROUND ART

As is known, the industrial bottling plants which are commercially available today usually use several operating machines arranged in series in order to perform the operations of rinsing, filling, corking/capping, labelling, etc.

For this purpose, the abovementioned operating machines have mounted peripherally, on a turntable, a plurality of operating heads with which the containers are associated, along their travel path around the turntable, in order to undergo the operations to be performed by the operating machine.

Transfer of the containers between the various operating machines, namely around the turntables of the said operating machines, is performed using conveying means such as screw feeders, motor-driven recessed starwheels, retaining grippers and conveyor belts.

There is a particularly pressing need in the sector to ensure versatile operation of the bottling plants using containers of varying shapes and sizes. For this purpose, the conveying means are currently adapted so as to retain correctly the containers, by replacing the screw feeders or the grippers, in particular so as to centre the containers correctly with respect to the heads of the operating machines. In fact, if the containers vary their position on the support base of the turntable when there is a variation in size, it is obvious that they will no longer be aligned with the operating heads of the various machines.

The adaptation which is required whenever there is a production change-over in order to use containers with a different shape obviously results in a considerable amount of time being lost and production downtime due to the plant being out of action, this having a negative effect on the overall production efficiency and therefore costs.

In order to overcome these drawbacks, numerous gripper-type conveying means able to operate with different-size containers have been developed. For example, the patent EP 0366225 describes an apparatus for conveying containers, equipped with a turntable rotating about a central axis of rotation. A plurality of grippers are mounted peripherally on said turntable, each of these grippers comprising a pair of arms which are pivotably mounted on a turntable support disc. The free end of each arm is provided with a projection for facilitating gripping of the containers, while the end connected to the central disc has, keyed thereon, a toothed wheel engaged with the toothed wheel of the other gripper arm. A vertical rod is connected at one end to one of the arms of the grippers and at the other end to a cam mechanism. The latter comprises a frustoconical cam which acts on a cam follower mechanically coupled with the vertical rod by means of lever mechanisms and resilient means. In operational terms, the cam causes a radial displacement of the follower away from or towards the central axis, causing a rotation of the vertical rod which, in turn, causes opening or closing of the gripper arms. This conveying apparatus also comprises a control device for adjusting the closing and opening angle of the grippers so as to allow the latter to retain containers which have a base of varying diameter. This control device comprises a gear-type raising mechanism which allows lowering or raising of the frustoconical cam so as to keep the cam follower more or less close to the central axis during the entire rotation of the turntable so as to reduce or increase the maximum closing or opening angle of the grippers.

This solution, however, in practice also has a number of drawbacks.

A first drawback consists in the fact that the grippers of this apparatus are intended to convey only containers with a circular base, but are unable to retain and centre correctly containers with other shapes commonly found in the market, such as bottles with a square, rectangular or triangular base.

A further drawback consists in the fact that adjustment operations are nevertheless required in order to adapt the grippers so that they can retain containers with different diameters. These operations require stoppage of the entire bottling plant with consequent production downtime and reduced efficiency of the production process.

Moreover, adjustment of the grippers, by means of the control device employed in the conveying apparatus described briefly above, does not solve entirely the problem of radial displacement of the containers when there is a variation in their shape and size, with the consequent risk of misalignment between the mouth of the containers and the heads of the operating machines.

Another drawback is associated with the high constructional complexity of the apparatus for conveying containers of the known type, which may give rise to faults or malfunctions.

DISCLOSURE OF THE INVENTION

The main object of the present invention is therefore to overcome the drawbacks arising with the solutions of the known type considered above by providing an apparatus for transferring containers which allows versatile use when there is variation both in the shape and in the size of the containers, without the need for laborious adaptation procedures.

A further object of the present invention is to provide an apparatus for transferring containers which allows the containers to be kept centred in their respective seats on the turntables when there is a variation in their shape and size.

A further object of the present invention is to provide an apparatus for transferring containers which is economical and simple to manufacture.

A further object of the present invention is to provide an apparatus for transferring containers which is operationally entirely reliable.

BRIEF DESCRIPTION OF THE DRAWINGS

The technical features of the invention, in accordance with the abovementioned objects, may be clearly determined from the contents of the accompanying claims and the advantages thereof will emerge more clearly from the detailed description which follows, provided with reference to the accompanying drawings which illustrate a purely exemplary and non-limiting embodiment thereof, where:

DETAILED DESCRIPTION

With reference to the accompanying drawings 1 denotes in its entirety the apparatus for transferring containers, in particular bottles or the like, according to the present invention.

It is intended to be used advantageously in industrial bottling plants for transferring bottles between different operating machines or conveying them through the machines so as to engage them with the operating heads.

The apparatus 1 may therefore replace a conventional recessed wheel for conveying containers or may be mounted on the supporting structure of a rotary operating machine such as a capsuling machine, a filling machine, a rinsing machine, a corking/capping machine, a labelling machine, and other similar machines.

Figure 1:
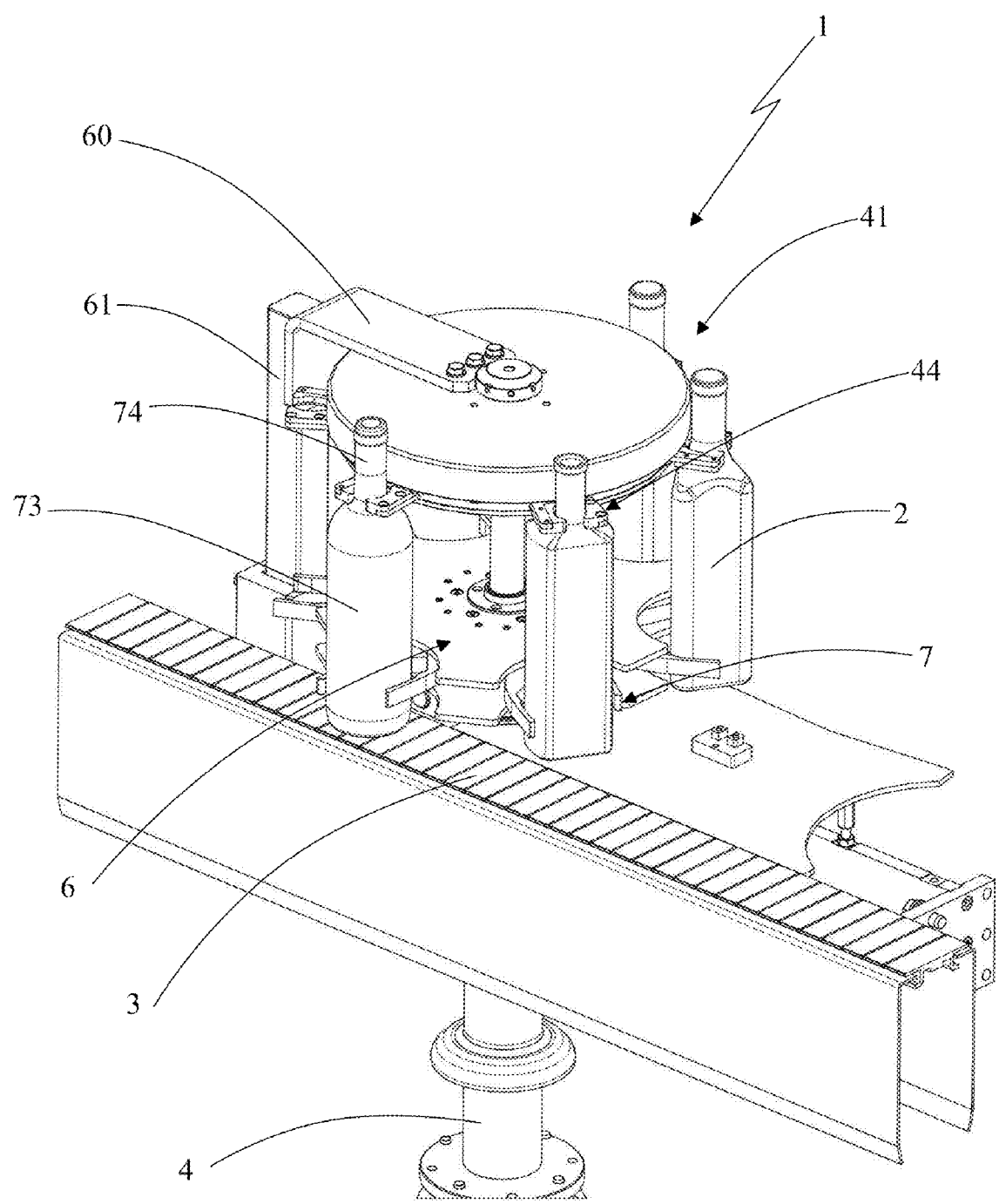
FIG. 1 shows a perspective view of the apparatus for transferring containers according to invention, associated with a bottling plant being supplied with containers of varying shapes.
Figure 2:
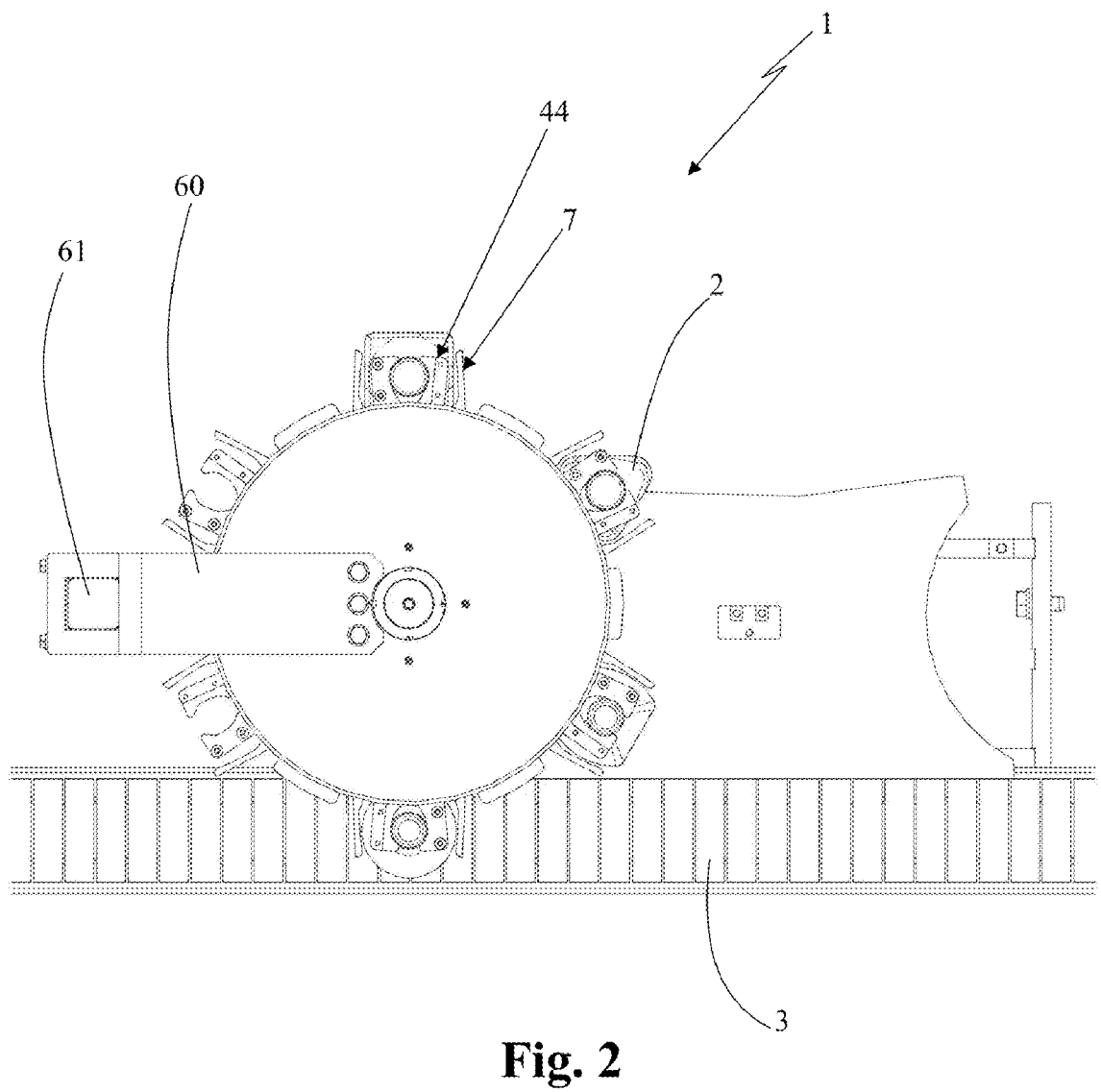
FIG. 2 shows a plan view of the apparatus according to FIG. 1.

In the example shown in FIGS. 1 and 2, the apparatus 1 is installed along a conventional bottling line with the function of picking up the containers 2 advancing on a conveyor belt 3 and then transferring them to a downstream operating machine or to another machine for conveying containers (not shown). Obviously, other conveying means such as screw feeders or recessed starwheels may be envisaged in place of the conveyor belt 3. For example, the conveying means may consist of a plurality of prongs moved by a motor-driven chain system, as described on Page 7, line 6, or Page 8, line 1, in Patent Application No. PD2006A000226 which is considered appended hereto for reference purposes.

Figure 4:
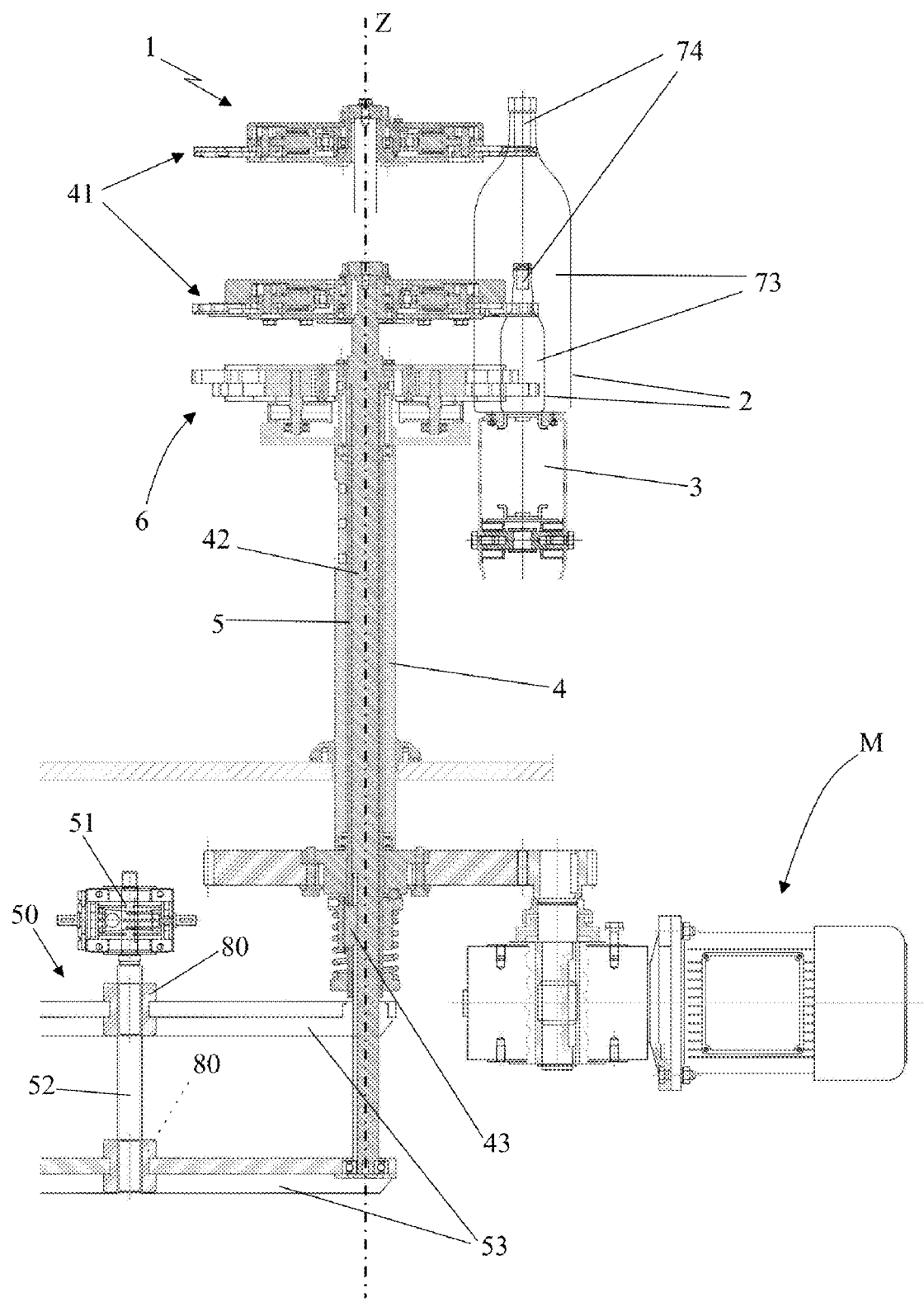
FIG. 4 shows a cross-sectional view along a vertical mid-plane of the apparatus for transferring containers according to invention, associated with a bottling plant and showing two containers which are different in size.
Figure 5:
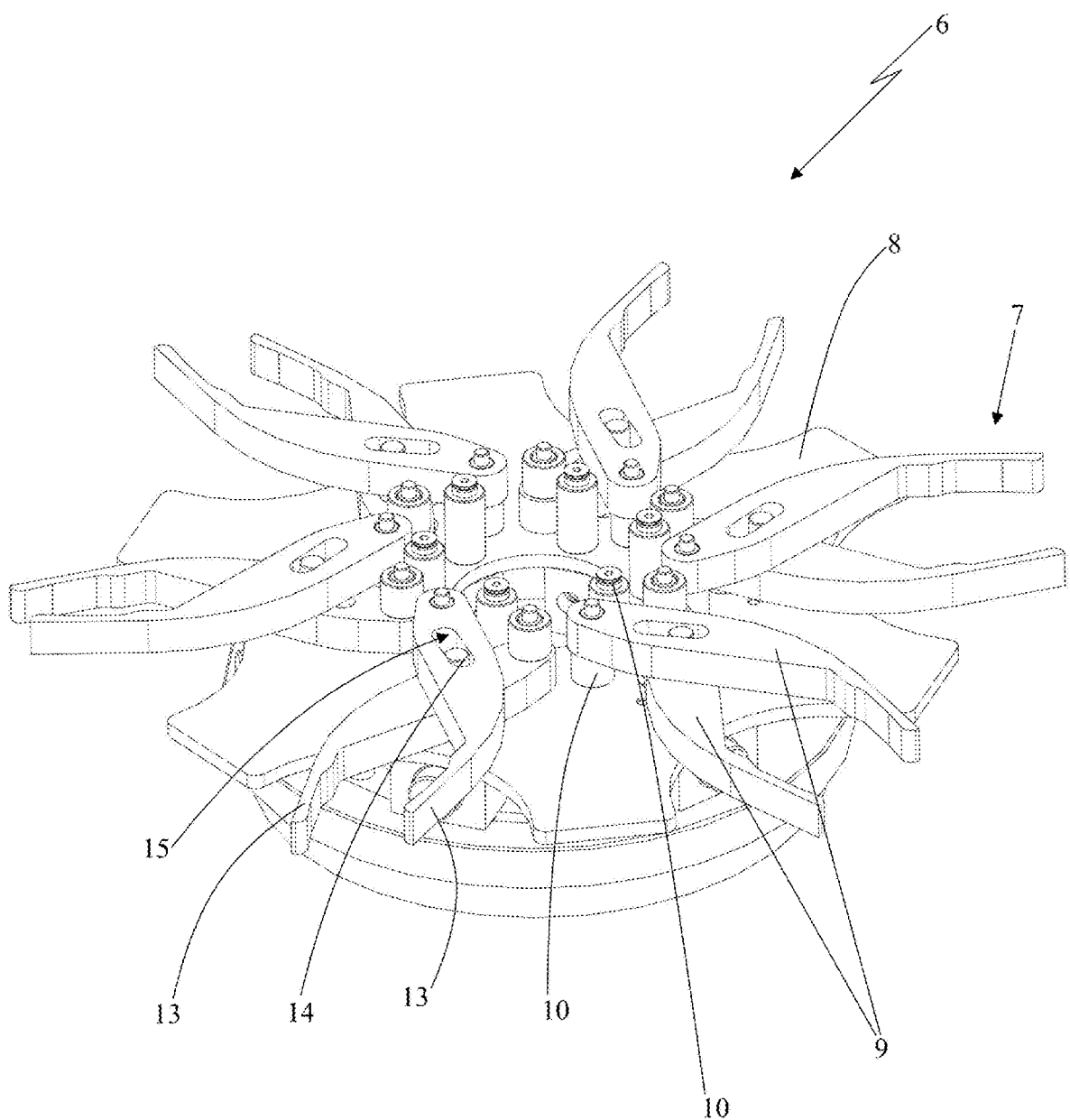
FIG. 5 shows a perspective view of a detail of the apparatus according to the invention relating to a first turntable with some parts removed so that the arrangement of the first grippers is more clearly visible.
Figure 6:
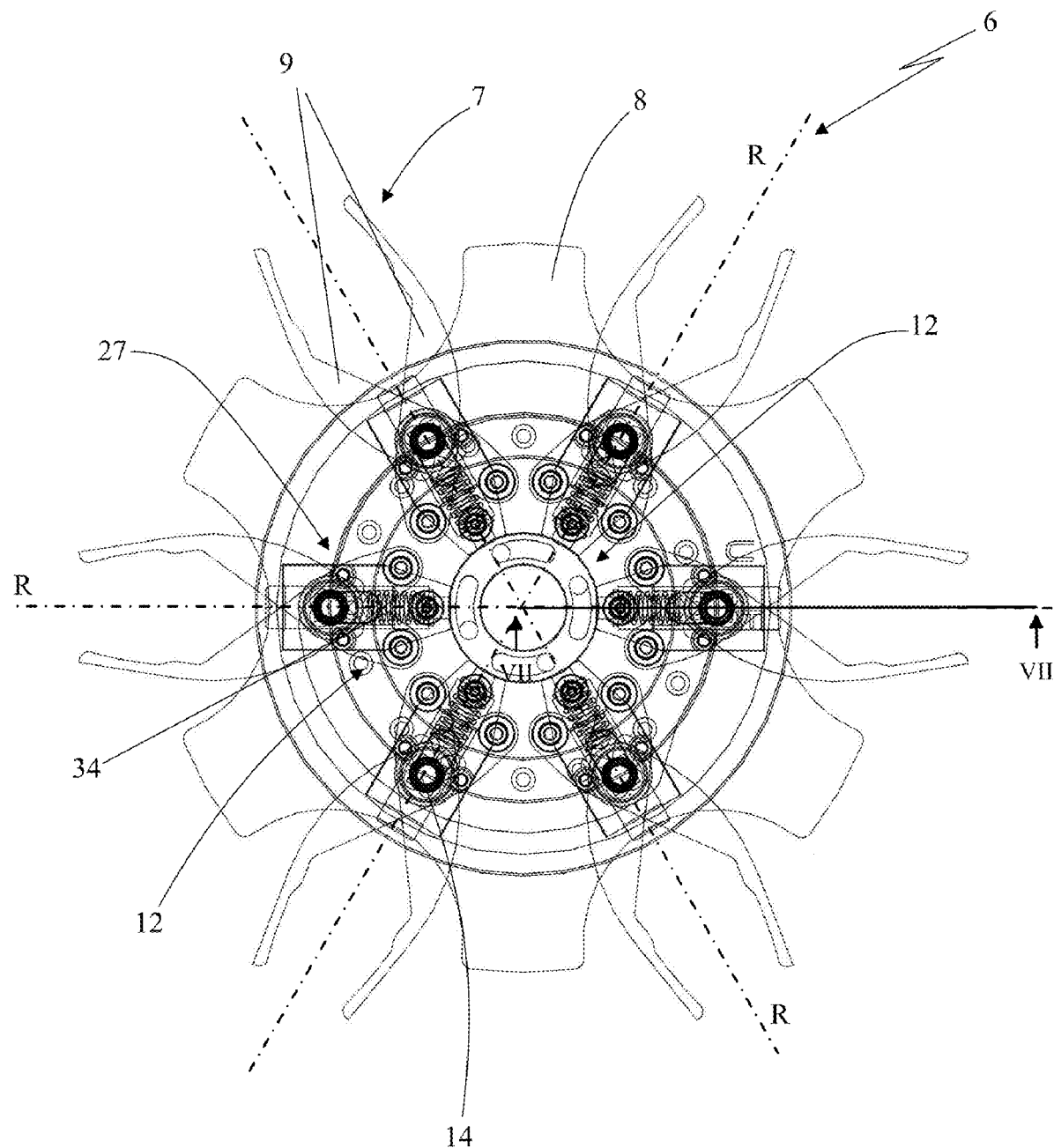
FIG. 6 shows a plan view of the first turntable of the apparatus shown in FIG. 5.
Figure 7:
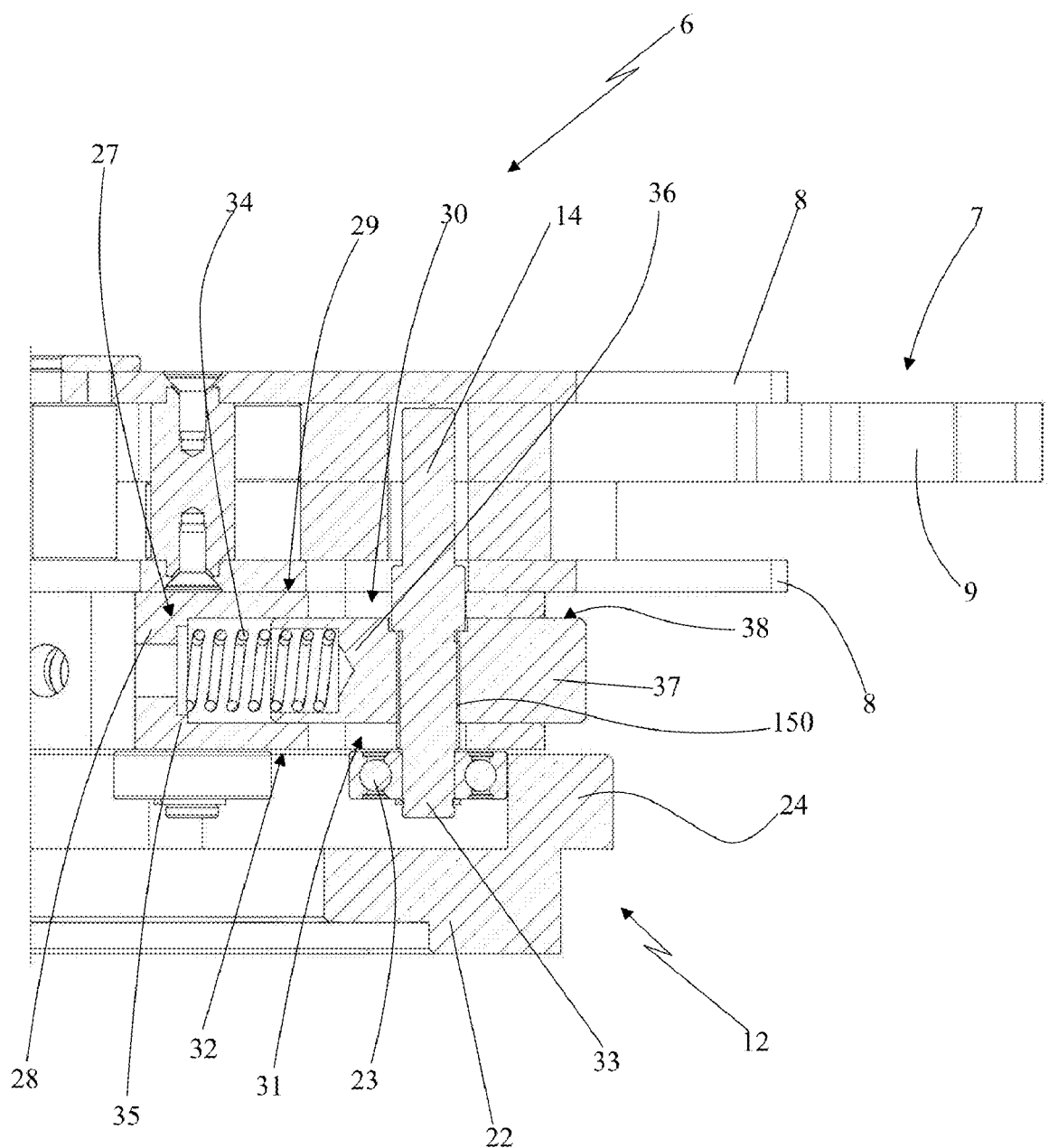
FIG. 7 shows a cross-sectional view of the first turntable shown in FIG. 6 along the line VII-VII of FIG. 6.

In accordance with the accompanying figures, the apparatus 1 according to the present invention comprises a support structure with a fixed cylindrical body 4 inside which a first drive shaft 5 is coaxially mounted by means of suitable first bearings. Said shaft extends along a vertical axis Z about which it is rotated by motor means M which are schematically indicated in FIG. 4. A first turntable 6 is fixed centrally onto the first shaft 5 and has peripherally mounted thereon at equally spaced intervals a plurality of first grippers 7, the number of which depends on the ratio between the pitch diameter of the main turntable of the operating machine associated with the apparatus 1 and the pitch diameter of the first turntable 6 or, essentially, the number of heads mounted on the main turntable of the operating machine.

The first turntable 6 is, for example, advantageously formed by a pair of opposite and parallel plates 8 which are fixed to the first drive shaft 5 by means of mechanical unions such as keys and/or hubs with the purpose of allowing the first turntable 6 to rotate, integrally with the first shaft 5, about the vertical axis Z.

Each first gripper (7) is provided with at least two first arms (9) which are constrained to the plates 8 by means of corresponding first pins 10 with respective first axes Y, Y' parallel to each other and to the vertical axis Z. These first arms 9 can be actuated by first actuator means 12 so as to rotate about the parallel axes Y, Y' between a first open position, where their respective first retaining portions 13 are spaced from each other so as to receive or release the containers 2, and a first closed position, where the first retaining portions 13 are close together so as to hold the containers 2 between them.

According to the idea forming the basis of the present invention, each first arm 9 of each first gripper 7 is provided with a slot 15 aligned with the slot of at least one other first arm 9 of the same first gripper 7. Moreover, it is envisaged that each first arm 9 of each first gripper 7 is arranged so that its projection in a horizontal plane of lie π intersects with the projection of at least one of the other first arms 9 of the same first gripper 7 in the region of the slots 15. The first arms 9 of each first gripper 7 are connected together by means of a first actuating element 14 engaged inside the slots 15. In functional terms, the actuating element 14 is moved by the first actuator means 12 inside the travel path of the slots 15 in a radial direction R which is horizontal and incident upon the vertical axis Z. The aforementioned displacement of the first actuating element 14 causes rotation of the first arms 9 about the first pins 10 between the first open position and the first closed position.

Figure 8:
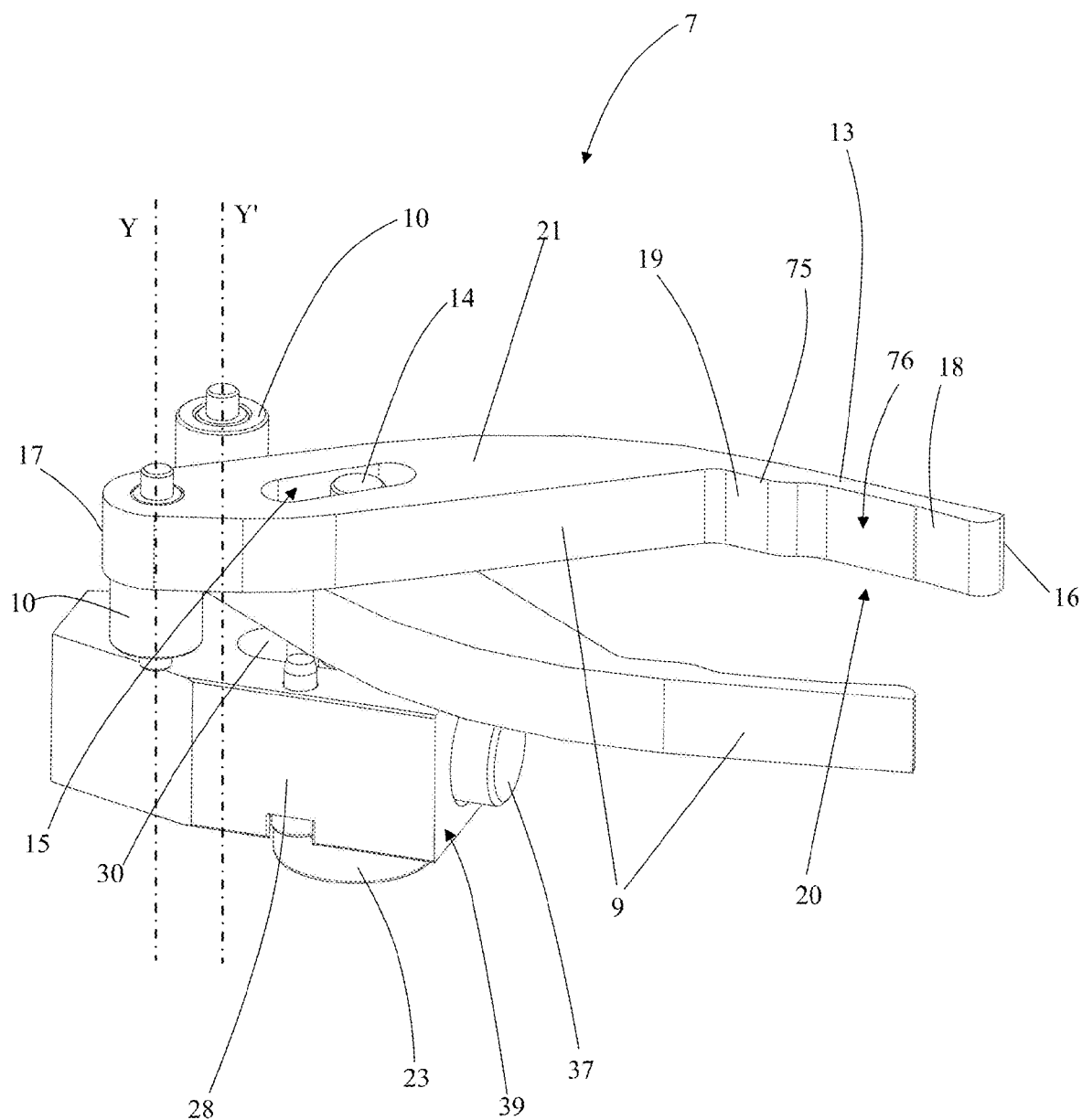
FIG. 8 shows a perspective view of a detail of the first turntable of the apparatus according to the invention relating to a first gripper.
Figure 9:
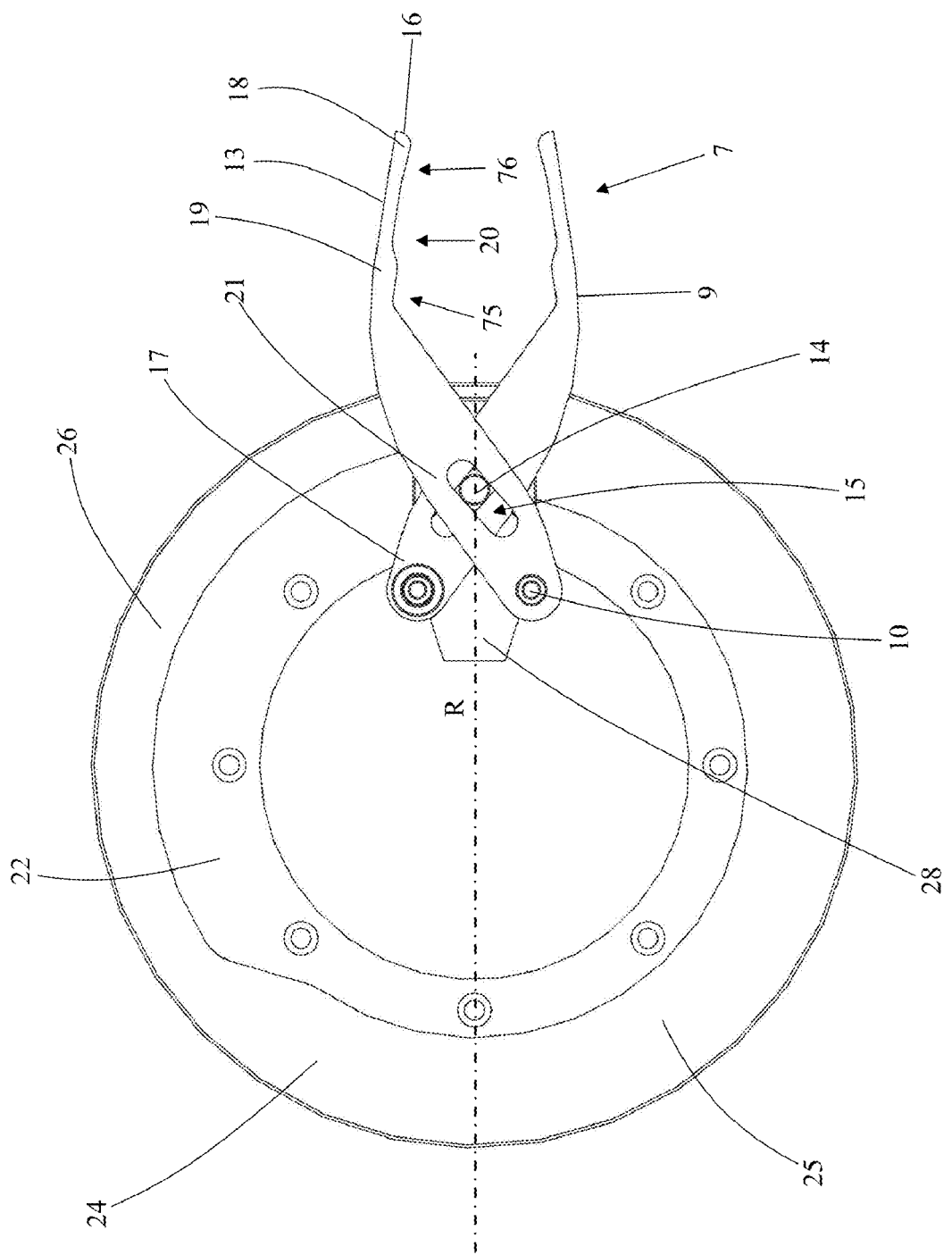
FIG. 9 shows a plan view of a detail of the first turntable shown in FIG. 5, relating to a first gripper and to the associated actuator means for causing opening and closing thereof, some parts having been removed so that this detail is more clearly visible.
Figure 10:
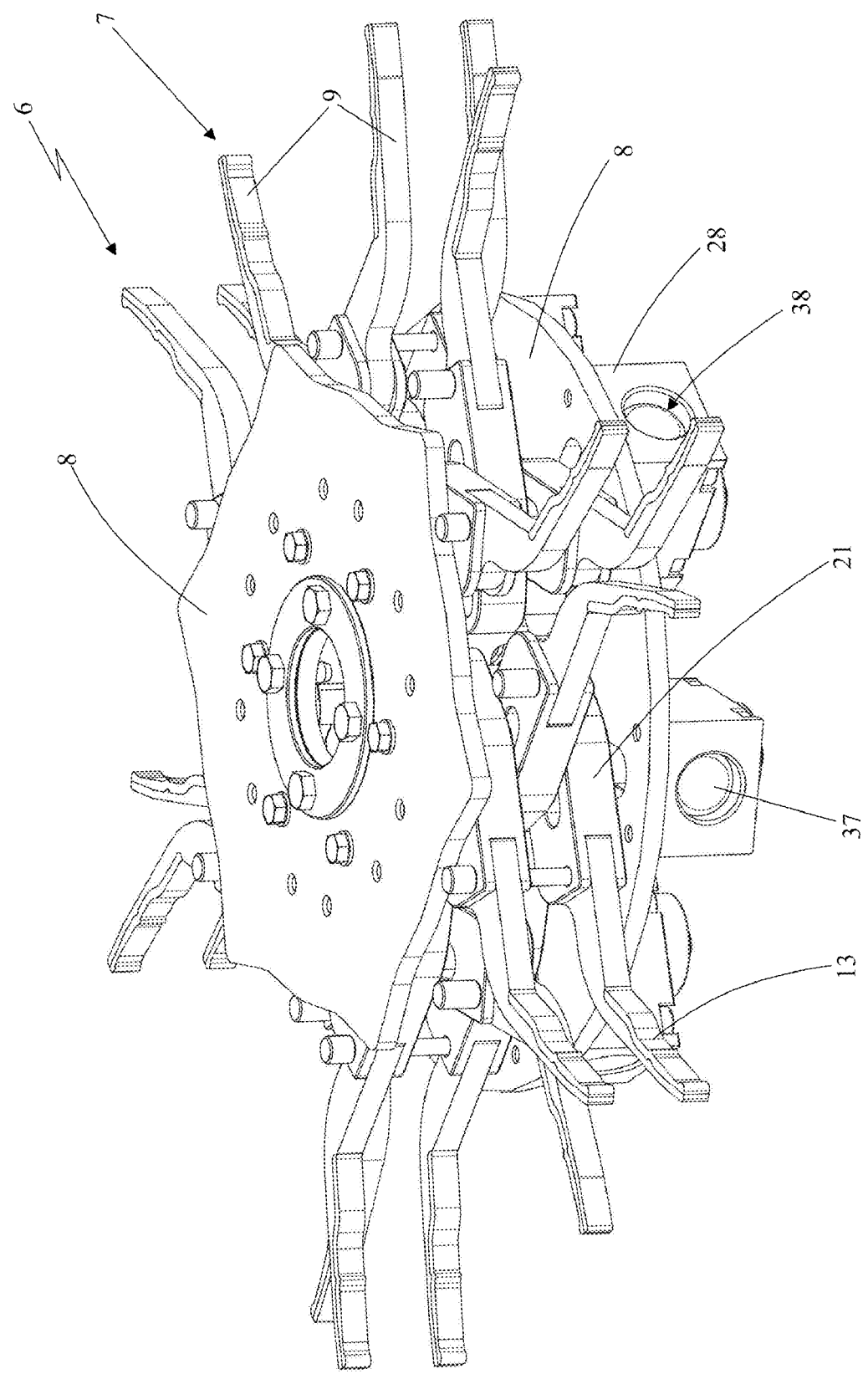
FIG. 10 shows a perspective view of a detail of the apparatus relating to the first turntable in accordance with a second embodiment of the invention.
Figure 11:
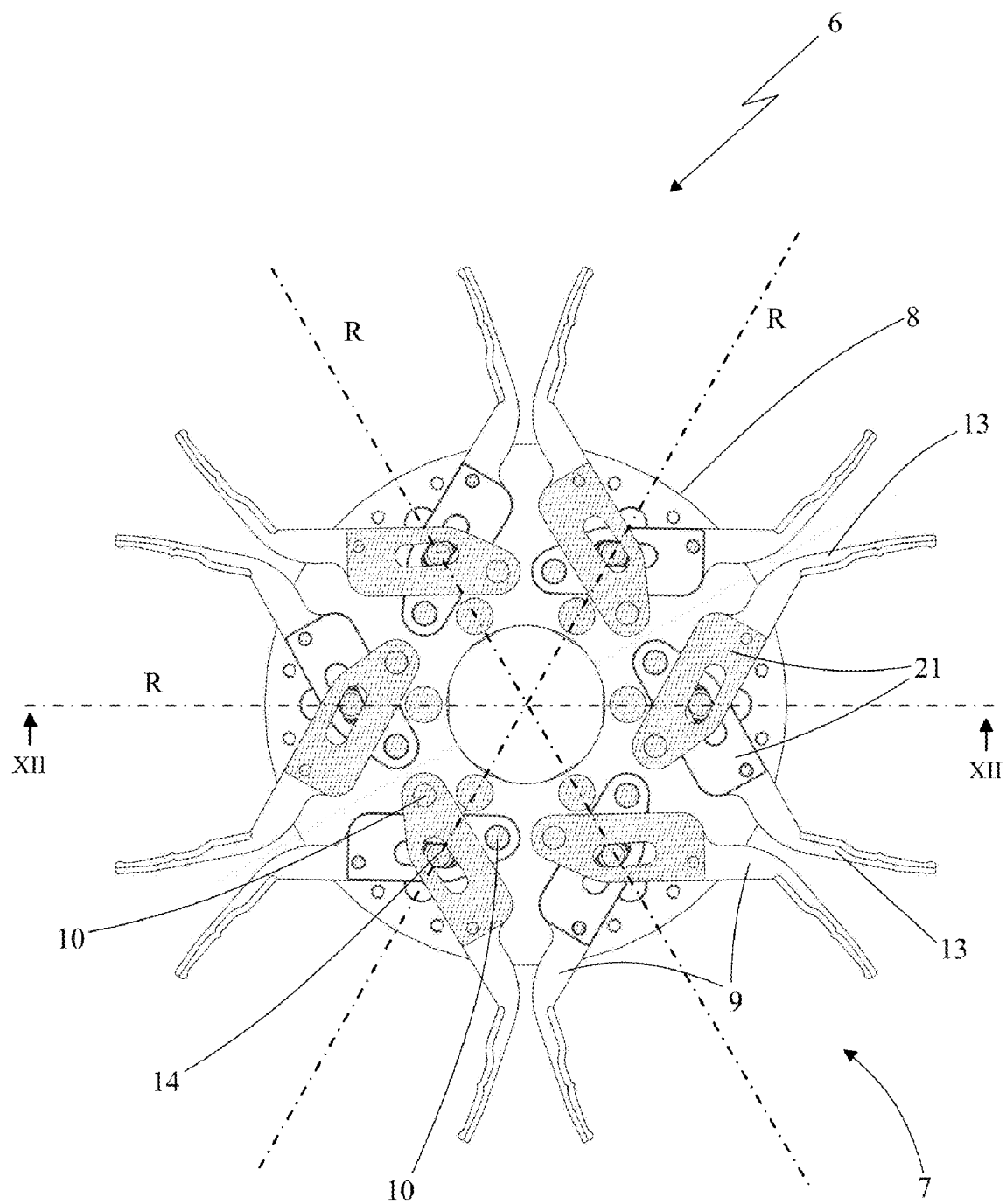
FIG. 11 shows a plan view of the first turntable of the apparatus shown in FIG. 10.
Figure 12:
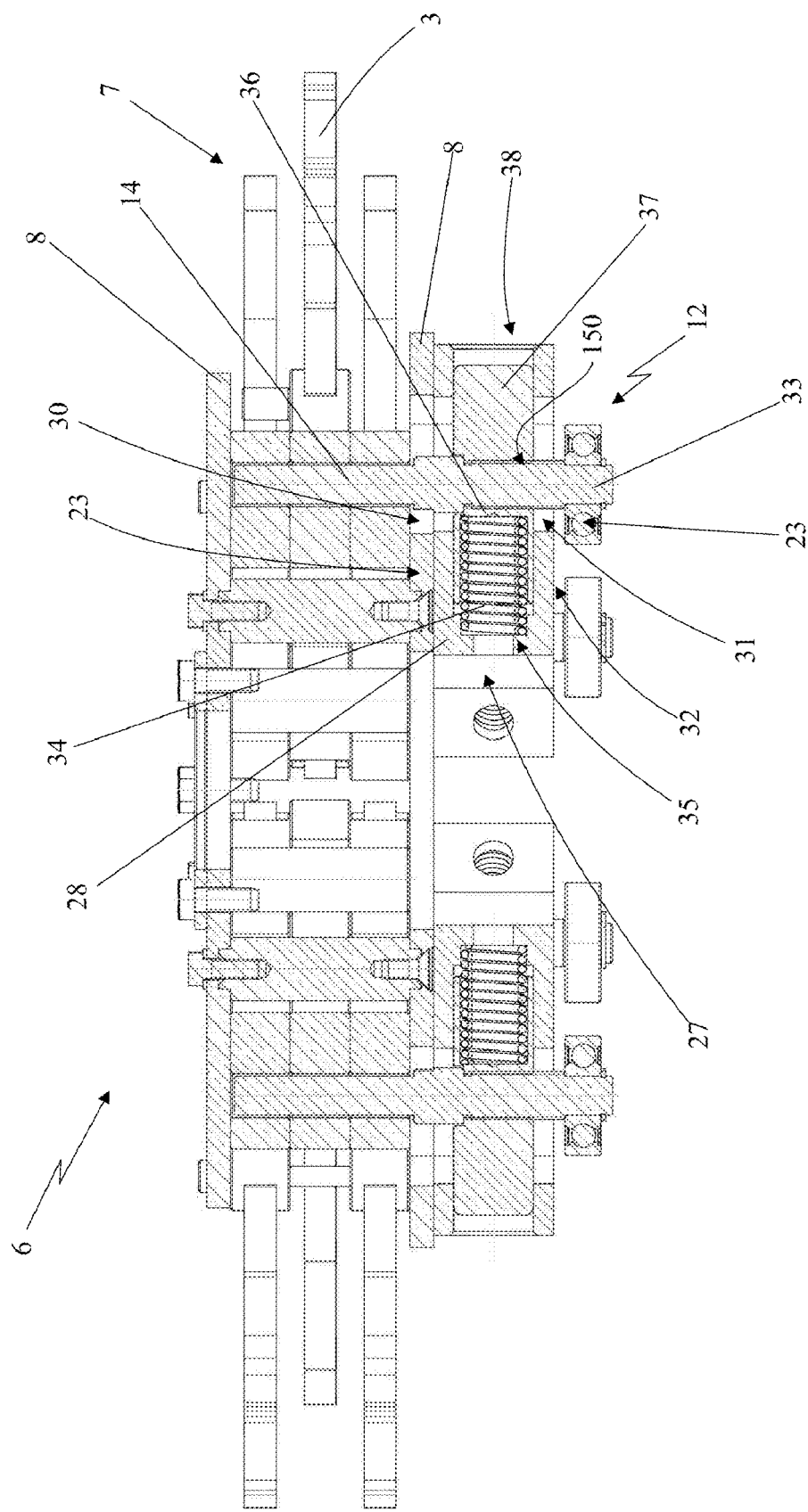
FIG. 12 shows a cross-sectional view of the first turntable shown in FIG. 11 along the line XII-XII of the same FIG. 11.
Figure 13:
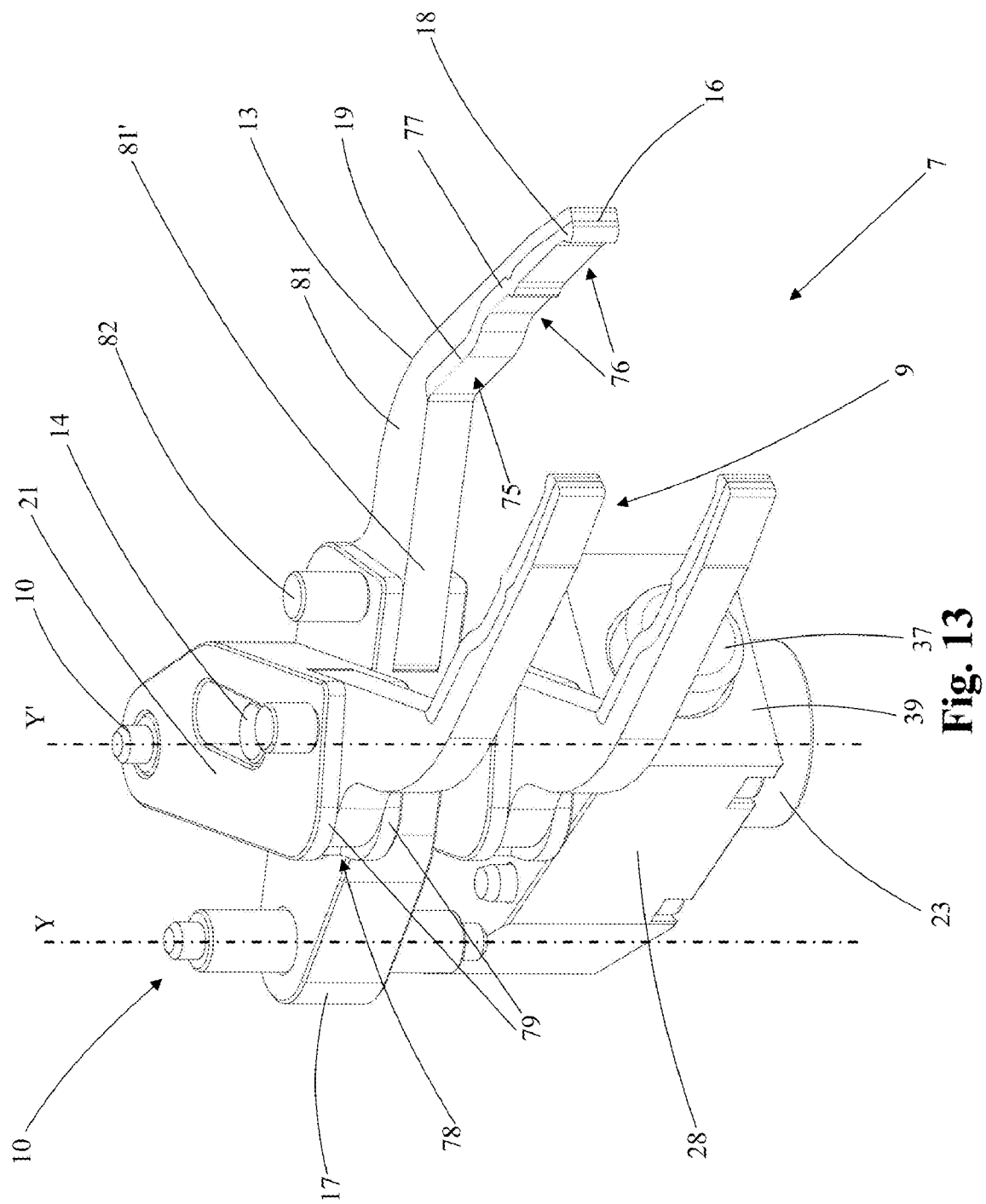
FIG. 13 shows a perspective view of a detail of the first turntable of the apparatus, relating to a first gripper in accordance with the second embodiment of the invention.
Figure 14:
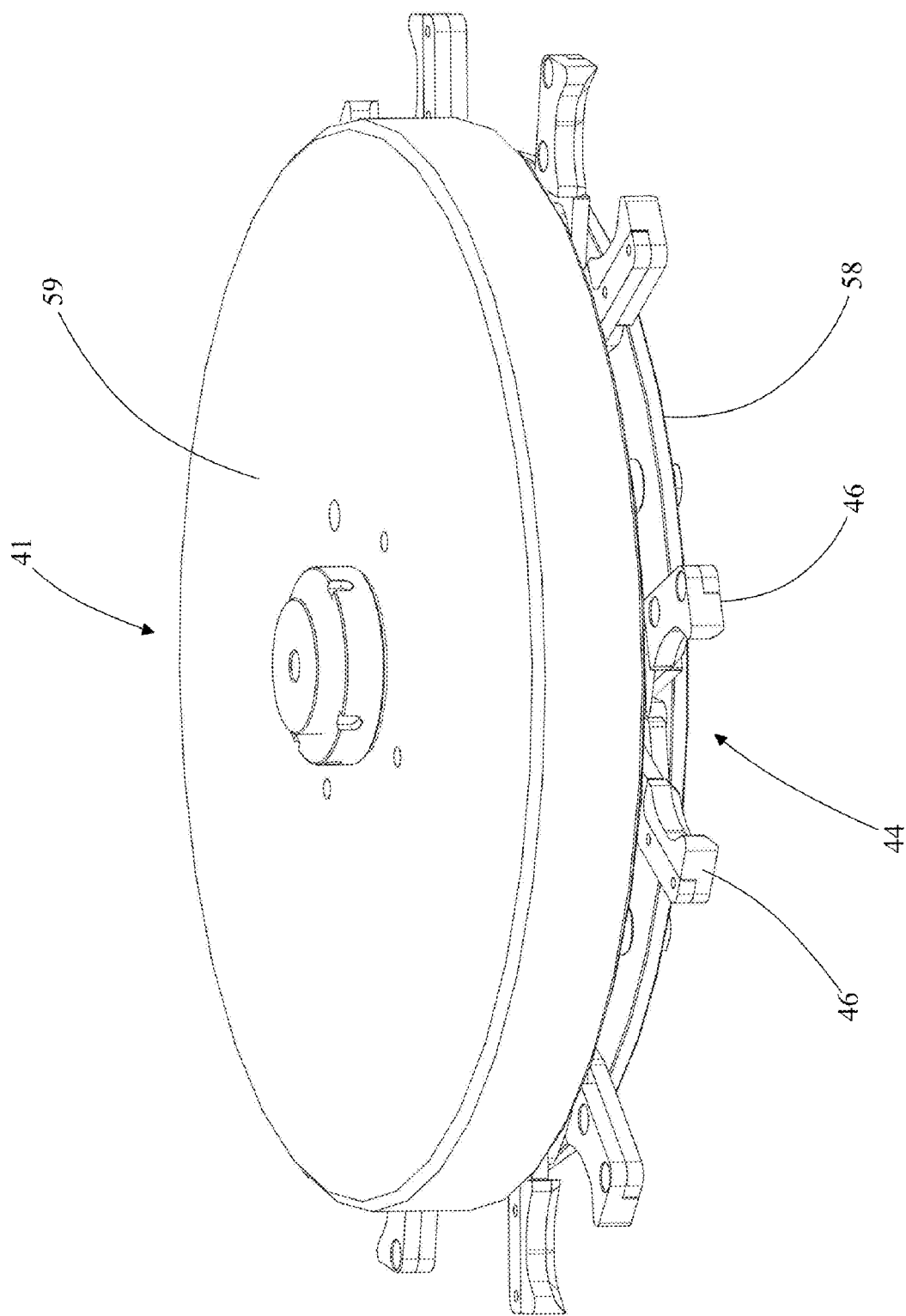
FIG. 14 shows a perspective view of a detail of the apparatus according to the invention relating to a second turntable.

In detail, with reference to FIGS. 8, 9 and 13, each first arm 9 has a free end 16, which is able to move during opening and closing so as to release and retain the container 2, and a constrained end 17 where the first arm 9 is engaged with the plates 8 of the first turntable 6 by means of the first pin 10.

The first arms 9 of each first gripper 7 cooperate with each other by means of the respective first retaining portions 13 so as to retain the container 2, moving in different planes parallel to the plane of lie π.

In particular, with reference to a first embodiment of the present invention, shown in FIGS. 1 to 9, the first grippers 7 of the first turntable 6 have two first arms 9 which intersect, one above and one below, in the manner of scissors.

In operational terms, when the first actuating element 14 is moved in the radial direction R by the first actuator means 12 towards the vertical axis Z, the first arms 9 rotate in opposite directions and cause opening of the first gripper 7. Vice versa, when the first actuating element 14 is moved away from the vertical axis Z, the first arms 9 cause closing of the first gripper 7.

Advantageously, in accordance with a second embodiment shown in FIGS. 10 to 13, each of the first grippers 7 has three first arms 9, the projections of two of which are situated in the plane of lie π, substantially coinciding and intersecting with the projection of the other first arm 9. In detail, with reference to FIG. 13, two first arms 9 which are constrained to the same first pin 10 with a first axis Y' are envisaged. In functional terms, during opening and closing of the first gripper 7, these two first arms 9 rotate simultaneously in the same direction about the same first pin 10. The remaining first arm 9, the projection of which intersects that of the other two arms, is pivotably mounted on a different first pin 10 with a first axis Y and is arranged in between the other two arms in the direction defined by the first parallel axes Y, Y'. In functional terms, this latter first arm 9 is intended to rotate about the first axis Y in the opposite direction to the other two arms so as to move its first retaining portion 13 towards or away from that of the other two first arms 9 in order to cause closing or opening of the first gripper 7. Obviously, all three first arms 9 of the same first gripper 7 are constrained together by the first actuating element 14 engaged inside their slots 15. The opening and closing movement of the first grippers 7 is produced by the displacement of the first actuating element 14 in the radial direction R in accordance with the same operating principle described above for the first embodiment.

According to both embodiments, the slot 15 extends with an elongated form along the extension of the first arm 9 preferably along an initial section 21 from the constrained end 17 so as to keep the first actuating element 14 close to the first pins 10 of the first arms 9. This arrangement is such that a relatively short displacement of the first actuating element 14 causes a broad rotation of the first arms 9, thereby ensuring rapid opening and closing of the first gripper 7 when the containers 2 are released and picked up. In particular, it is extremely important that the container 2 should be always released by the first gripper 7 of the apparatus 1 on the operating machine perfectly centred at the point of tangency between the path which it follows on the apparatus 1 and the path followed by the heads of the operating machine. If opening of the grippers does not occur in a sufficiently rapid manner, the container 2, in particular if large in size, is positioned beyond the point of tangency, thereby being out of alignment with the operating heads. The apparatus 1, according to the invention as described above, therefore is provided with first grippers 7 which are able to open and close with great rapidity so as to ensure immediate release of the container 2 following the displacement of the first actuating element 14 by the first actuator means 12. Obviously, this characteristic feature is particularly advantageous also for the release of a container on any conveying means, such as conveyor belts, screw feeders or recessed starwheels, or during pick-up of the container.

Advantageously, as shown in detail in FIGS. 8, 9 and 13, the first retaining portions 13 of each of the first arms 9 have a first projecting section 18 which is formed in the vicinity of the free end 16 and is slightly tapered from this end and a second step-like projecting section 19 with a first flat surface 75 arranged in an intermediate position between the first projecting section 18 and the slot 15. These projecting sections 18, 19 define between them an intermediate depressed section 20 which has a second flat surface 76 substantially parallel to the first surface 75. When the first arms 9 are in the closed position these projecting sections 18, 19 and this depressed section 20 are able to receive the containers 2 so as to ensure that they are retained when there is a variation in their shape and size.

In particular, with reference to FIGS. 1 and 2, with the first arms 9 in the closed position, the first projecting section 18 and the depressed section 20 of each first retaining portion 13 are intended to grip the convexities or the corners of containers 2 which have a base of small width and varying shape, for example circular, rectangular or square shape. The second projecting section 19 is able to grip large-size containers 2 so as to ensure that they are retained, in cooperation with the first projecting section 18 or with the depressed section 20. The second projecting section 19 is also intended to grip the corners of containers 2 which have a polygonal base, in particular a triangular, rectangular or square base.

Preferably, the first retaining portions 13 of the first arms 9 are lined with a layer of plastic (not shown) able to adapt the first retaining portions 13 perfectly to the shape of the container 2 which rests against them so as to improve gripping thereof and avoid any risk of damage to the container 2 itself.

In accordance with the example of embodiment shown in detail in FIGS. 10-13, a third projecting section 77 is envisaged, this being arranged between the first projecting section 18 and second projecting section 19 so as to form a further contact point during gripping of containers which have a particular shape and size.

In accordance with a further advantageous feature of the present invention, the first arms 9 may be disassembled and separated from the corresponding first grippers 7 so as to allow the bottling plant to function without the container conveying apparatus 1 and in operating conditions where the passage of the containers arranged, for example, on conveyor belts would interfere with the gripper arms. In detail, with reference to the embodiment of the first arms 9 shown in FIGS. 10 to 13, the abovementioned first arms 9 are each formed by a front section 21 and by an end section 81 which are removably connected together. For this purpose, the front section 21 is provided with a seat 78 inside which an end portion 81' of the end section 81 of the first arm 9 engages. The seat 78 has a flattened form and is defined by horizontal and parallel walls 79. Once inserted inside the seat 78 with its end portion 81' arranged between the two walls 79, the end section 81 of the first arm 9 is fixed to the front section 21 for example by means of a first screw 82 which is engaged inside first aligned through-holes formed in the walls 79 of the guide 78 and in the end portion 81'. With this structural solution it is possible to exclude, in a particularly rapid and easy manner, the first grippers 7 from the container conveying operations. In fact, in order to prevent the first grippers 7 from occupying the path for movement of the containers 2, it is sufficient to disassemble only the end sections 81 of the first arms 9, without having to remove the latter entirely or without having to disassemble further components of the entire first turntable 6 such as the first pins 10 or the plates 8.

In accordance with an advantageous solution of the present invention, the first actuator means 12 comprise a first cam 22 which is fixed to the support structure, coaxially with the first shaft 5. A first cam follower 23 is coupled with the first cam 22, being mounted on the first actuating element 14 engaged inside the slot 15 of the first arms 9.

In detail, the first cam 22 is fixed to the fixed cylindrical body 4 for example by means of screws. With reference to FIG. 9, said cam has the form of a ring with an inner perimetral profile 24 shaped with a first projecting segment 25, which interacts with the first cam follower 23 so as to bring the first grippers 7 into the first open position, and a second recessed segment 26, which interacts with the cam follower 23 so as to bring the first grippers 7 into the first closed position.

Advantageously, first resilient means 27 are envisaged, these being connected to the actuator means 12 and exerting a permanent radial thrust on the first actuating element 14 in order to press the first cam follower 23 against the profile of the first cam 22.

With reference to the example of embodiments shown in FIGS. 6 to 13, the first actuator means 12 comprise, for each first gripper 7, a first box-shaped body 28 which is fixed underneath the plates 8 of the first turntable 6 which keep the first grippers 7 opposite the slots 15 formed in the first arms 9 and with its first side 29 adjacent to the bottom plate 8.

The first box-shaped body 28 has a first opening 30, formed in the first side 29, and a second opening 31, formed in a second side 32, opposite to the first side, both being aligned with the slots 15 in the first arms 9. These openings 30, 31 are passed through by the first actuating element 14 which advantageously consists of a first rod which is parallel to the vertical axis Z and which projects with its bottom end 33 from the second opening 31 in the first box-shaped body 28. This bottom end 33 has, rotatably and idly mounted thereon, the first cam follower 23 which preferably consists of a roller wheel or a bearing. The first and second openings 30, 31 have an elongated form so as to allow radial displacement of the first actuating element 14.

In greater detail, the first aforementioned resilient means 27 comprise a first spring 34, preferably of the spiral type, housed inside the first box-shaped body 28 in a radially extending direction with respect to the first turntable 6. Said spring is compressed between the bottom 35 of the first box-shaped body 28 and a seat 36 formed at the end of a plug 37 slidably engaged inside the first box-shaped body 28. The plug 37 has a second transverse through-hole 150 aligned with the openings 30, 31 in the first box-shaped body 28 and with the slots 15 in the first arms 9, which second through-hole 150 is passed through by the first actuating element 14 so as to transfer to the latter the radial thrust exerted by the spring 34 and keep the first cam follower 23 pressed against the profile of the first cam 22. In particular, the plug 37 is engaged inside the first box-shaped body 28 by means of a third opening 38 formed in a third side 39 perpendicular to the first side and the second side 29, 32 of the said first box-shaped body 28.

In operational terms, when the first turntable 6 positions the first cam follower 23 opposite the first projecting segment 25 of the first cam 22, the first follower 23 is pushed radially towards the vertical axis Z, bringing the first arms 9 of the first gripper 7 into the first open position. When the first cam follower 23 is positioned opposite the second recessed segment 26 of the first cam 22, the spring 34 pushes, by means of the plug 37, the first actuating element 14 away from the vertical axis Z, bringing the first grippers 7 into the first closed position.

Obviously, the first cam 22 may have several projecting and/or recessed segments in order to perform opening and closing of the first grippers 7 several times. The position of the segments 25 and 26 of the first cam 22 is designed to release and pick up the containers 2 correctly relative to the arrangement of the operating machines and the conveyors with which the apparatus 1 is intended to co-operate.

In accordance with a particularly advantageous embodiment of the present invention, the apparatus 1 for transferring containers 2 comprises a second turntable 41 coaxially fixed to a second shaft 42, substantially parallel to the first turntable 6, and arranged at a distance from the latter along the vertical axis Z. The second shaft 42 is coaxially engaged inside the first shaft 5 and rotatably constrained thereto.

Figure 3:
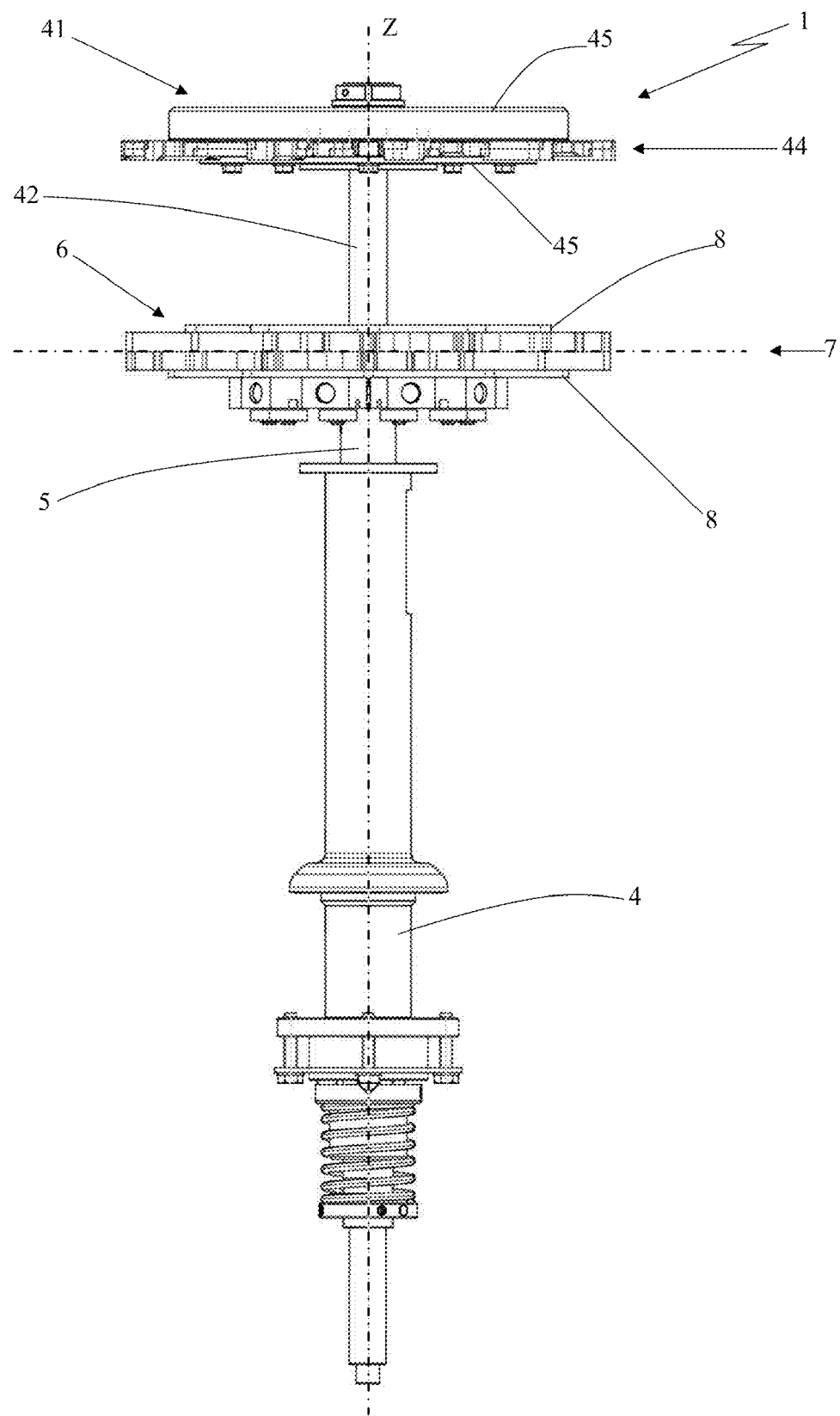
FIG. 3 shows a side view of the apparatus for transferring containers according to invention.

In particular, as can be seen in FIGS. 3 and 4, the second shaft 42 is connected to the first shaft 5 by means of a tongue-like part 43 for transmitting the rotational movement so as to allow the second shaft 42 to rotate about the vertical shaft Z integrally with the first shaft 5. Advantageously, the tongue-like part 43 allows the second shaft 42 to slide axially with respect to the first shaft 5, thereby allowing the vertical position of the second turntable 41 to be adjusted, as will be explained in detail below.

The second turntable 41 has, peripherally mounted thereon at equally spaced intervals, a plurality of second grippers 44 aligned axially with the corresponding first grippers 7 of the first turntable 6 so as to co-operate during gripping of the same container 2.

In detail, the second turntable 41 has a pair of parallel and horizontal discs 58 which are fixed to the second shaft 42 and on which the second grippers 44 are mounted, being arranged between the two said discs 58. A fixed cover 59 is also provided, being arranged parallel to the discs 58 and secured by means of an anti-rotation bracket 62 to a support bar 61 of the support structure, as shown, for example, in the embodiment according to FIGS. 1 and 2.

Each second gripper 44 has at least one pair of second arms 46 constrained to the second turntable 41 by means of corresponding second pins of 47 with second parallel axes. These second arms 46 can be actuated by second actuator means 48 so as to rotate about their second parallel axes between at least one second open position, where respective second retaining portions 49 of the second arms 46 are spaced from each other so as to receive or release the containers 2, and at least one second closed position, where the second retaining portions 49 are close together so as to hold the containers 2 between them.

With reference to FIG. 1, the first grippers 7 are advantageously intended to grip the containers 2 around their wide body part 73, while the second grippers 44 intended to retain the grippers 2 always in the region of their neck 74 so as to ensure centring of the mouth of the containers 2 with the heads of the operating machines or correctly position the containers 2 in other conveying means situated further downstream.

Advantageously, the apparatus 1 according to the present invention comprises regulating means 50 able to slidably move the second shaft 42 along the vertical axis Z so as to vary the vertical position of the second turntable 41 relative to the first turntable 6.

In accordance with the embodiment shown in FIG. 4, the regulating means 50 comprise a gear motor 51 which is fixed to the support structure of the apparatus 1. The gear motor 51 is connected to a threaded transmission rod 52 engaged inside a counter-threaded bush 80 which has, integrally fixed thereto, a movable base 53 connected by means of second bearings to the bottom end of the second shaft 42 on which the second turntable 41 is mounted.

FIG. 4 shows two different operating conditions of the apparatus 1, where the second turntable 41 is arranged at two different heights along the vertical axis Z so as to allow the second grippers 44 to retain, by means of their neck 74, containers 2 of two different sizes.

In functional terms, so as to adapt the apparatus 1 to operate with containers 2 of different heights, it is sufficient to activate the gear motor 51 and thus raise or lower the movable base 53 which vertically displaces the second shaft 42, causing it to slide axially inside the first shaft 5 and thus producing the consequent raising or lowering movement of the second turntable 41.

Advantageously, each second arm 46 of each second gripper 44 is provided with a seat 55 which is arranged in the vicinity of the respective second pin 47 and which receives, engaged therein, a second actuating element 54 movable radially by the second actuator means 48 so as to cause rotation of the second arms 46.

Figure 15:
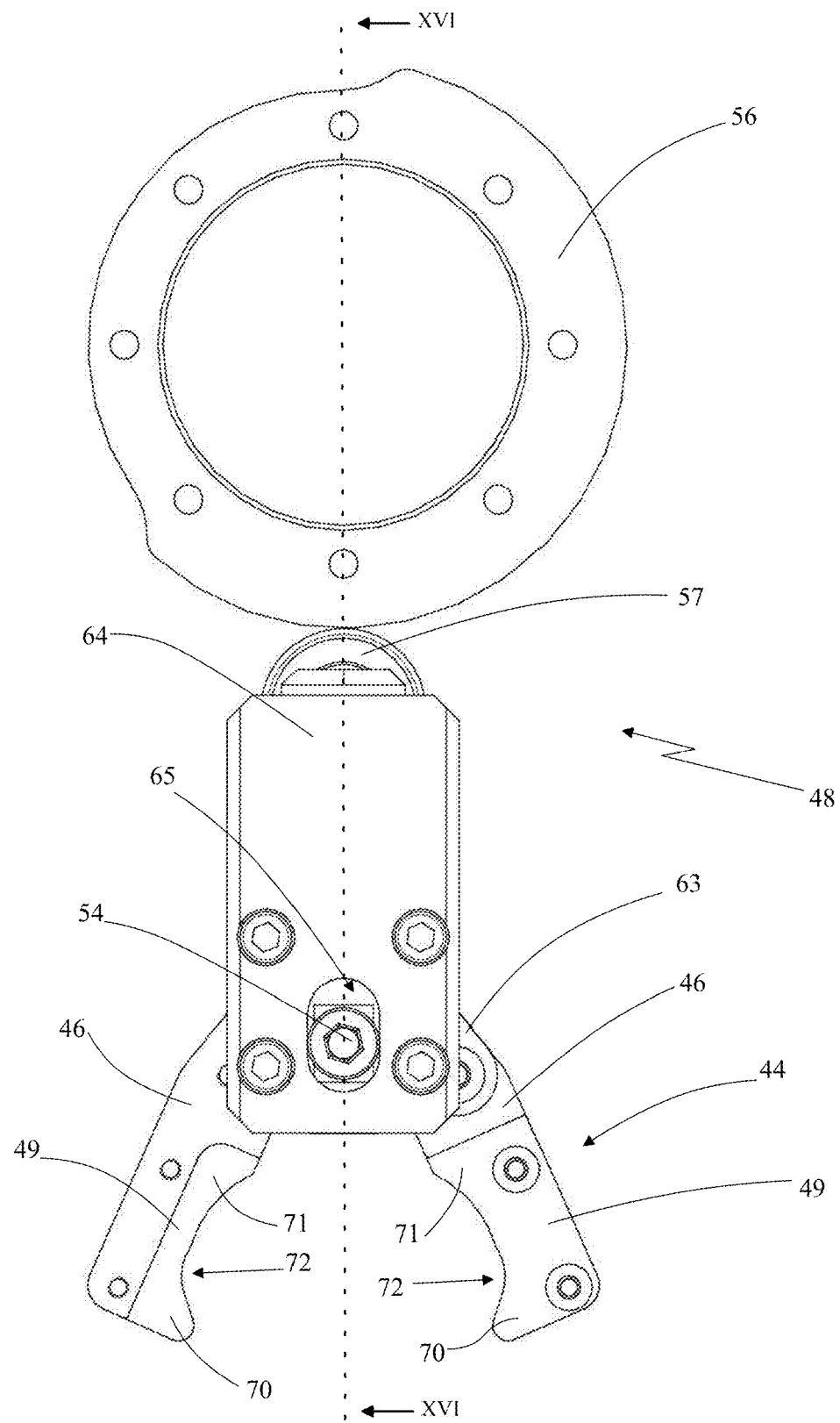
FIG. 15 shows a plan view of a detail of the second turntable shown in FIG. 14, relating to a second gripper and to the associated second actuator means for performing opening and closing thereof.
Figure 16:
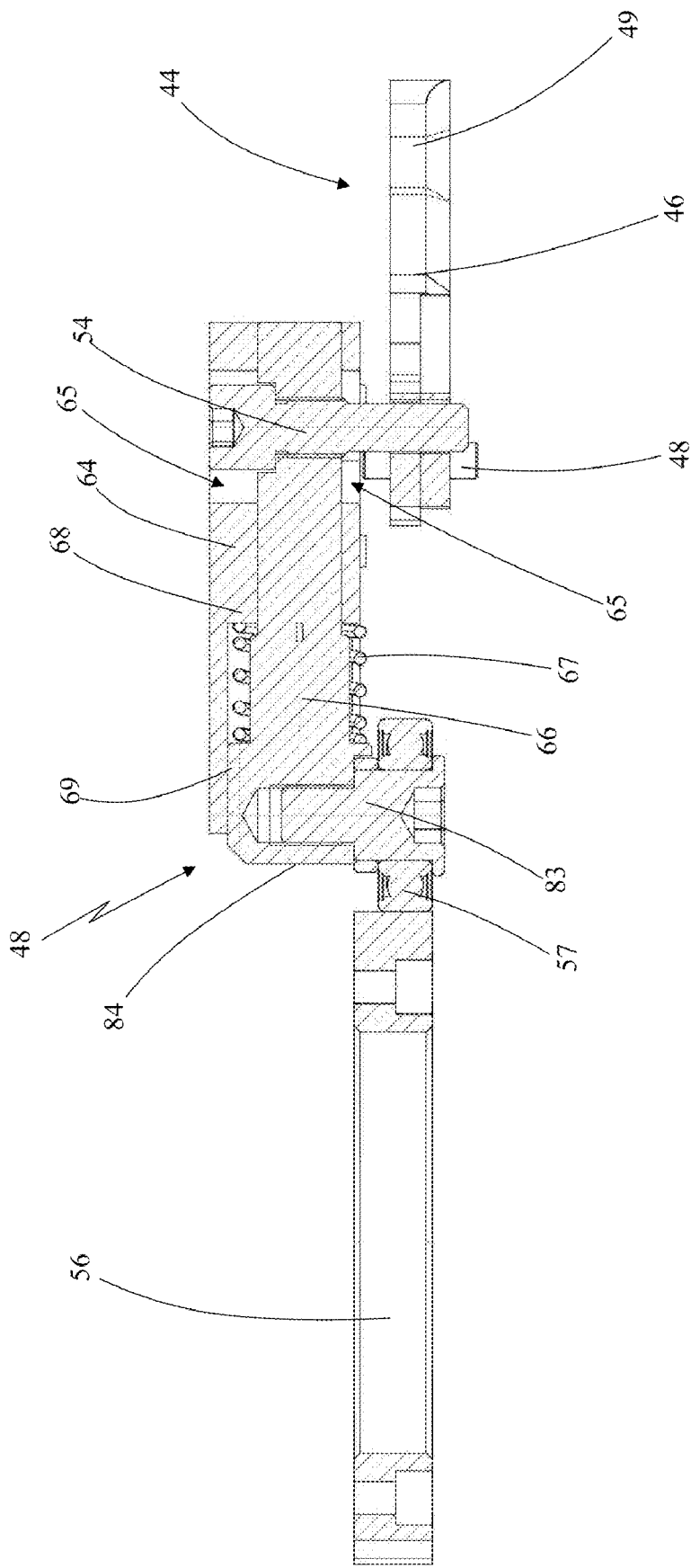
FIG. 16 shows a cross-sectional view of the detail of the apparatus shown in FIG. 15 along the line XVI-XVI of the same FIG. 15.
Figure 17:
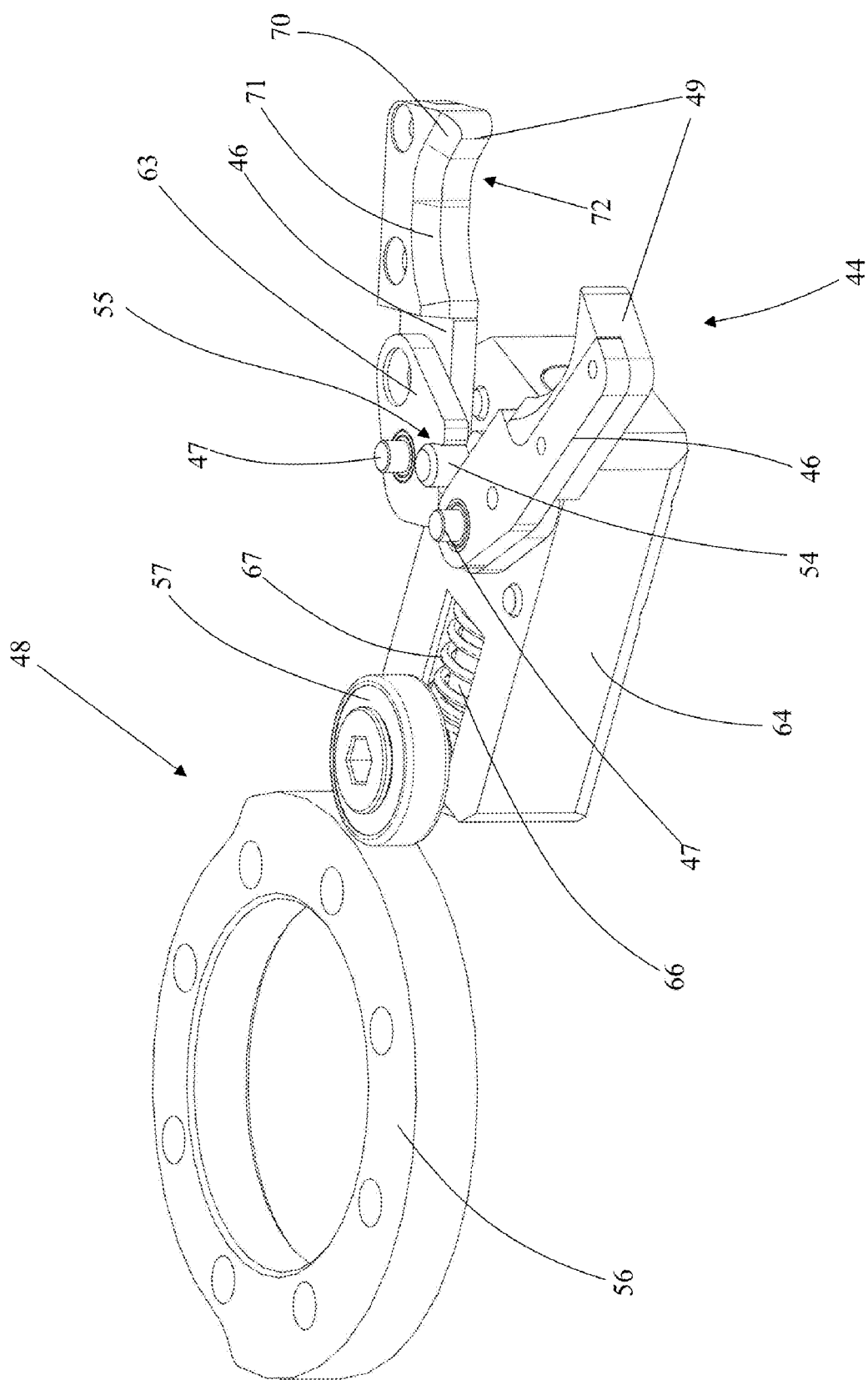
FIG. 17 shows a bottom perspective view of the detail of the apparatus shown in FIG. 15.

In accordance with the particular embodiment shown in FIGS. 15, 16 and 17, each second arm 46 has a shaped plate-like element 63 which is fixed thereto in the region of the second pin 47 and in which the seat 55, preferably with a substantially semi-circular shape, is formed. The two shaped plate-like elements 65 of the two second arms 46 of a same second gripper 44 are arranged in two different planes parallel to the horizontal plane of lie π. Said elements are partially superimposed with their recesses 55 arranged opposite each other so as to allow engagement of the second actuating element 54 therewith.

Usefully, the second actuator means 48 comprise a second cam 56 integrally connected to the support structure, arranged coaxially with the second shaft 42 and having, coupled therewith, a second cam follower 57 mounted on the second actuating element 54. In detail, this second cam 56 is fixed to the cover 59 of the second turntable 41. Obviously, the profile of the second cam 56 is shaped so as to cause opening and closing of each second gripper 44 in a manner which is perfectly synchronized with the corresponding first gripper 7 with which it cooperates in order to retain the said container 2.

Preferably, second resilient means are provided so as to exert a radial thrust on the second actuating element 54, pressing the second cam follower 57 against the profile of said second cam 56.

Still with reference to the embodiment shown in FIGS. 15, 16 and 17, the second actuator means 48 comprise a second box-shaped body 64 which is provided, on two of its opposite sides, with four oppositely facing openings 65 which are aligned vertically and have a radially elongated form and inside which the second actuating element 54 is intended to be displaced. Said second actuating element 54 is connected to the second cam follower 57 by means of a horizontal pin 66 able to slide inside the second box-shaped body 64 integrally with the said second actuating element 54. In greater detail, the second actuating element 54 is formed by a second screw which engages inside a first threaded hole formed transversely in the pin 66. The second cam follower 57 consists of a roller or bearing mounted idle on a third pin 83 screwed rigidly inside a second threaded hole provided on the inner end 84 of the pin 66.

The second resilient means comprise a second spring 67, which is preferably of the spiral type, compressed between a first shoulder 68 formed in the second box-shaped body 64 and a second shoulder 69 formed on the periphery of the pin 66, so as to keep the second cam follower 57 pressed against the outer edge of the second cam 56.

In accordance with a particularly advantageous embodiment shown in FIGS. 19 to 25, the second arms 46 of the second grippers 44 are engaged directly inside a recess 85 formed in the second box-shaped body 64 and constrained thereto by means of the second pins 47. Advantageously, the second actuating element 54 consists of an elongated body, preferably made of tempered steel, with a circular cross-section and radially slidable inside the second box-shaped body 64. As shown in detail in FIGS. 23 and 25, this second actuating element 54 has, at an outer end 86 thereof, a mushroom-shaped head 87 intended to engage inside seats 55 of the shaped plate-like elements 63 of the second arms 46. The aforementioned second elongated actuating element 54 has an elongated form owing to a shank 88 which is suitably connected with a substantially frustoconical part 88' to the head 87 so as to prevent the shaped plate-like elements 63 of the second arms 46 from interfering with the second actuating element 54 during the operations for opening and closing the second grippers 44. Moreover, in accordance with this particular solution, the shaped plate-like elements 63 move in a same horizontal plane and are suitably spaced so as not to hinder each other during their movement. The second spring 67 of the second resilient means acts on the second actuating element 54. For this purpose, the said second spring 67 is arranged between the first shoulder 68, formed in the second box-shaped body 64, and the second shoulder 69, formed peripherally in the second actuating element 54. The second spring 67 thus mounted presses the second cam follower 57 against the profile of the second cam 56, transmitting the thrust via the third pin 83.

Figure 21:
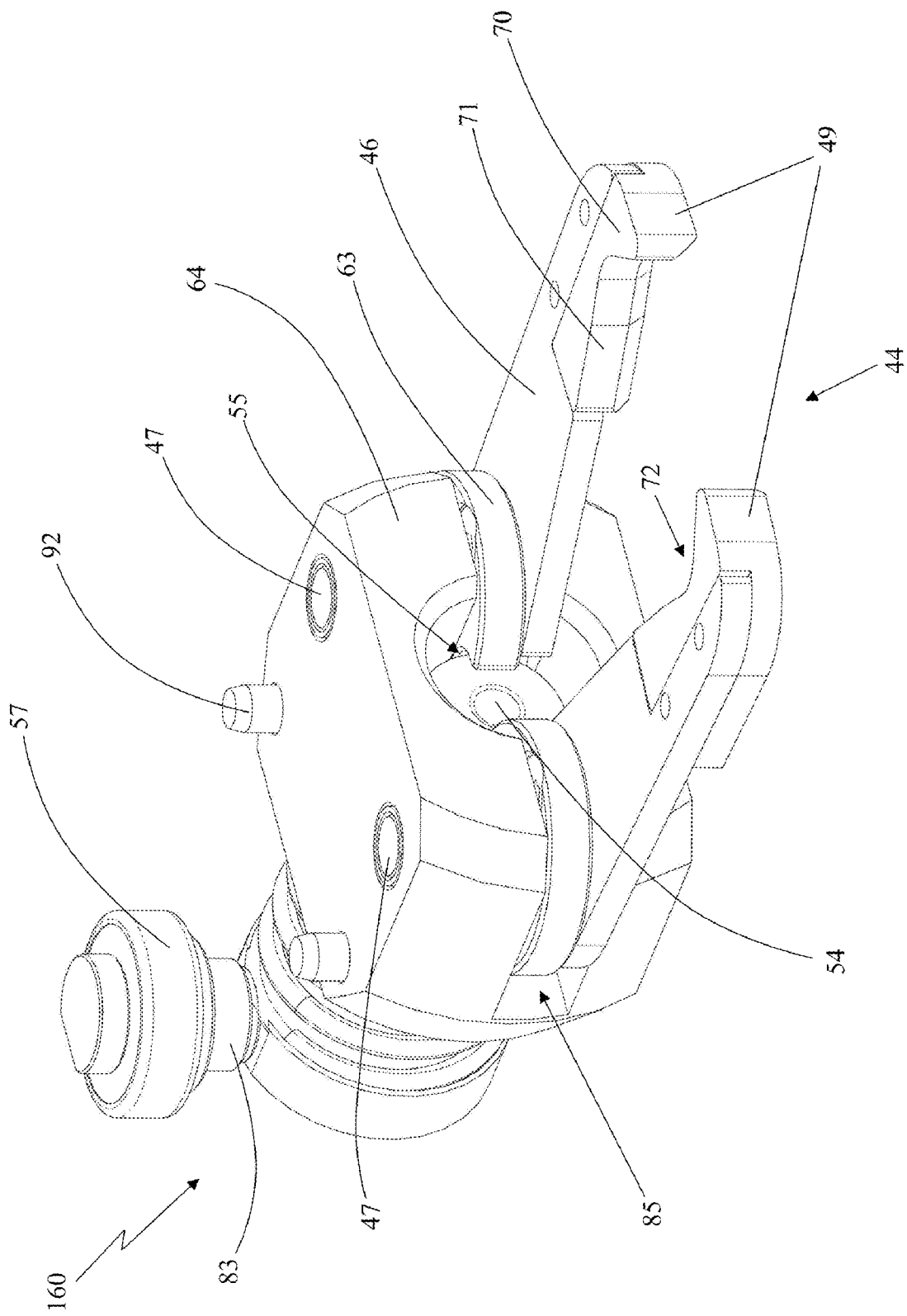
FIG. 21 shows a perspective view of a detail of the second turntable shown in FIG. 20, relating to the second gripper and to the associated second actuator means in accordance with the third embodiment of the invention.
Figure 22:
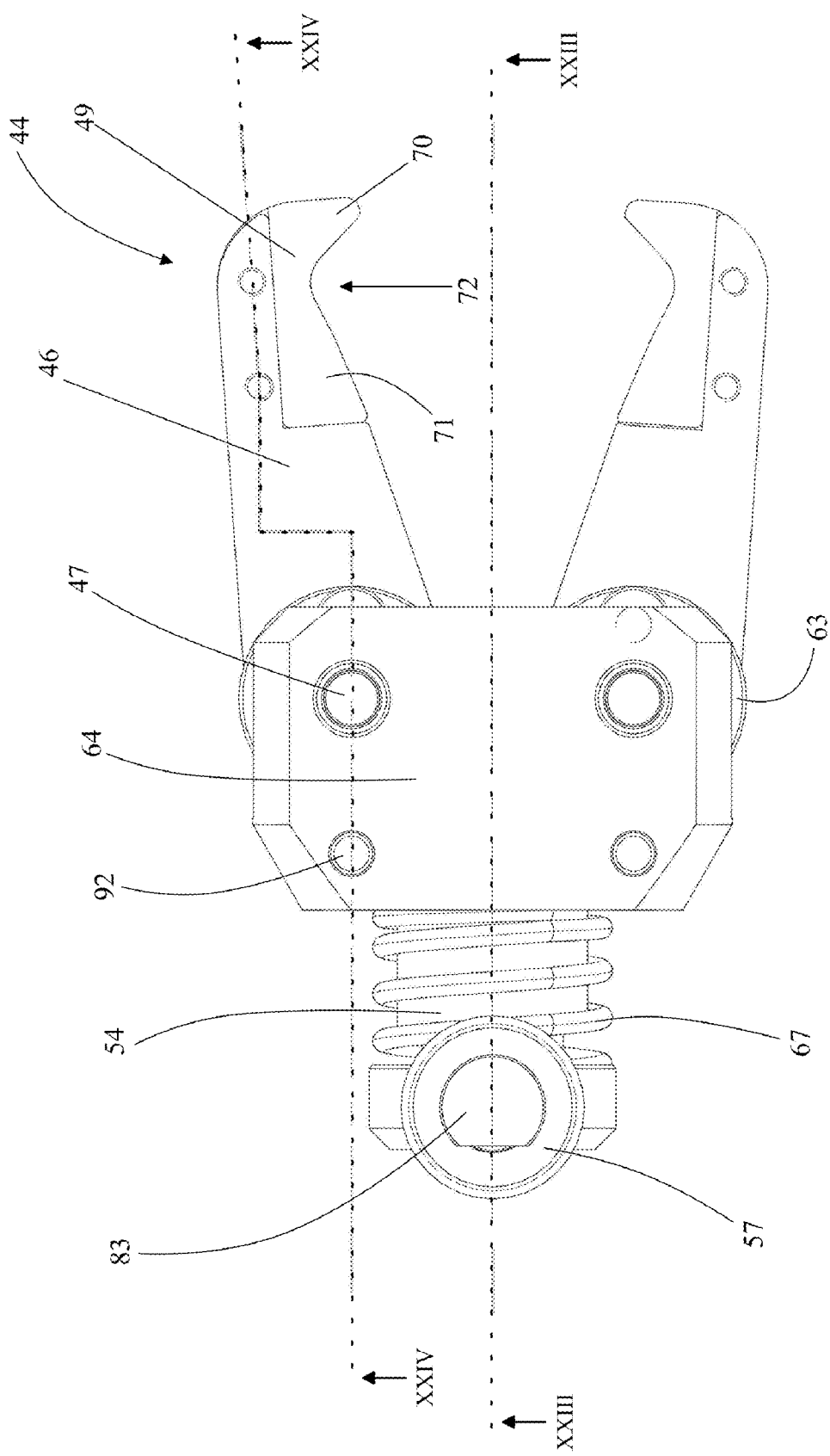
FIG. 22 shows a plan view of the detail of the apparatus shown in FIG. 21.
Figure 23:
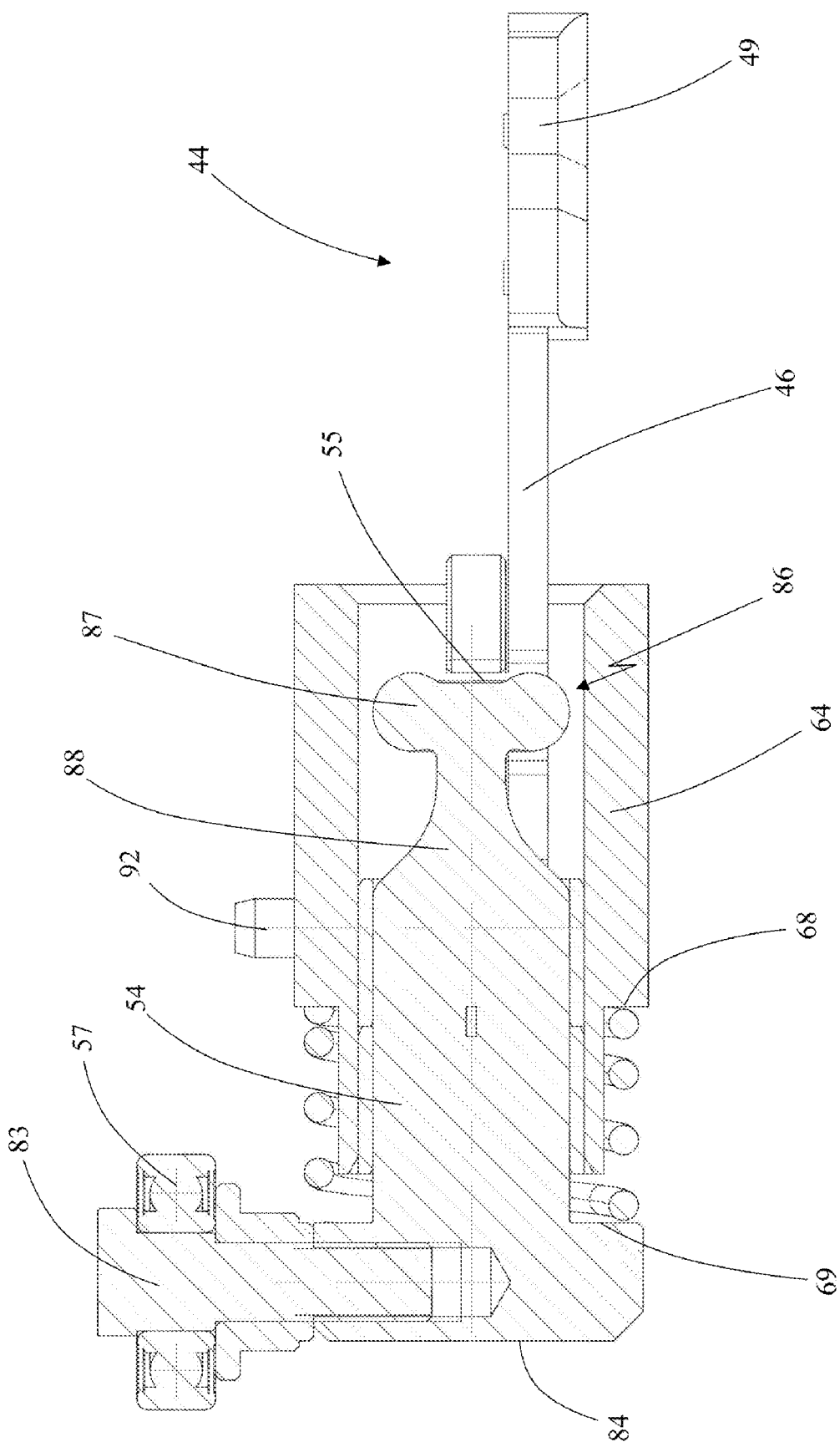
FIG. 23 shows a cross-sectional view of the detail of the apparatus shown in FIG. 22 along the line XXIII-XXIII of the same FIG. 22.
Figure 24:
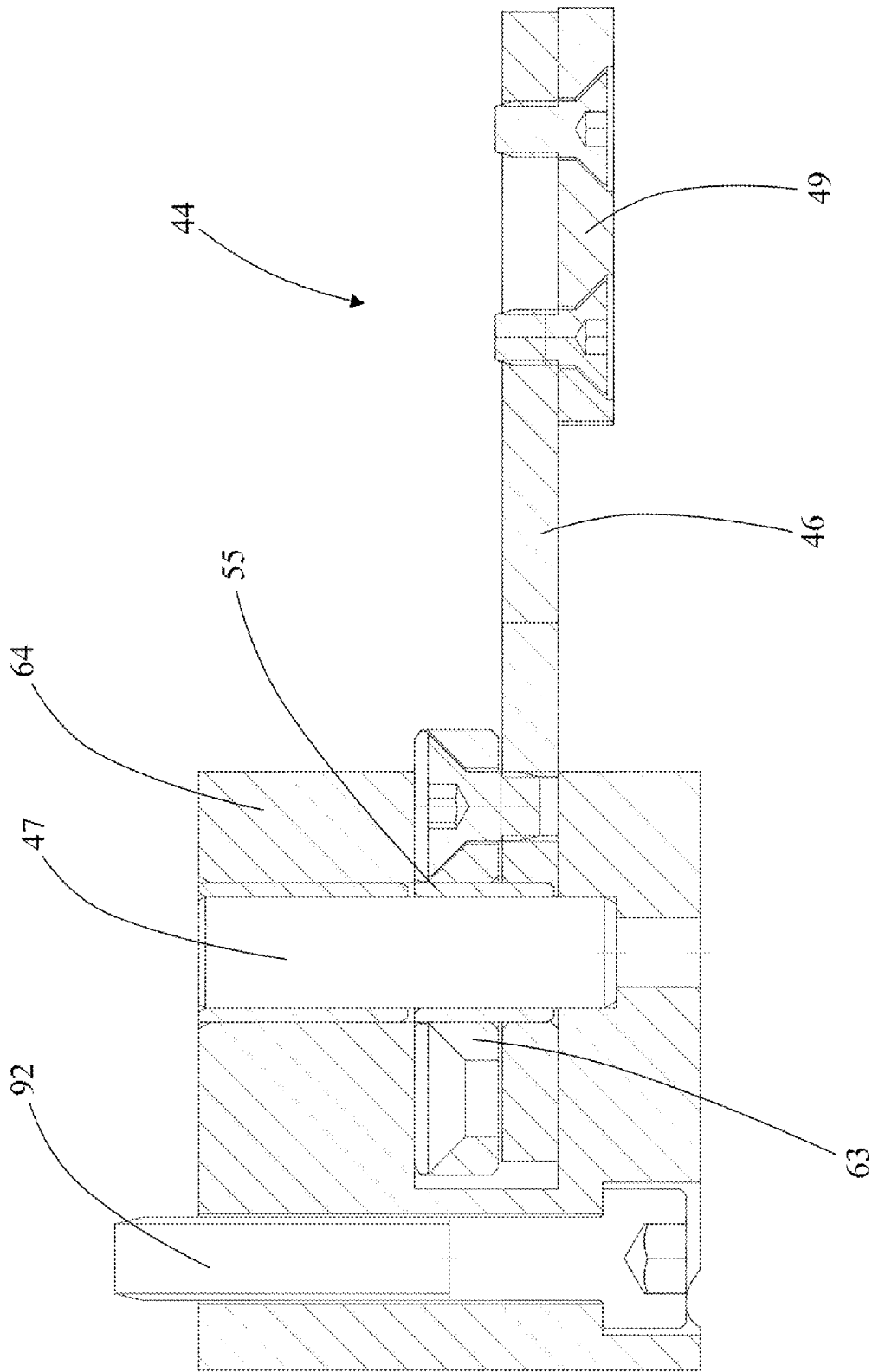
FIG. 24 shows a cross-sectional view of the detail of the apparatus shown in FIG. 22 along the line XXIV-XXIV of the same FIG. 22.
Figure 25:
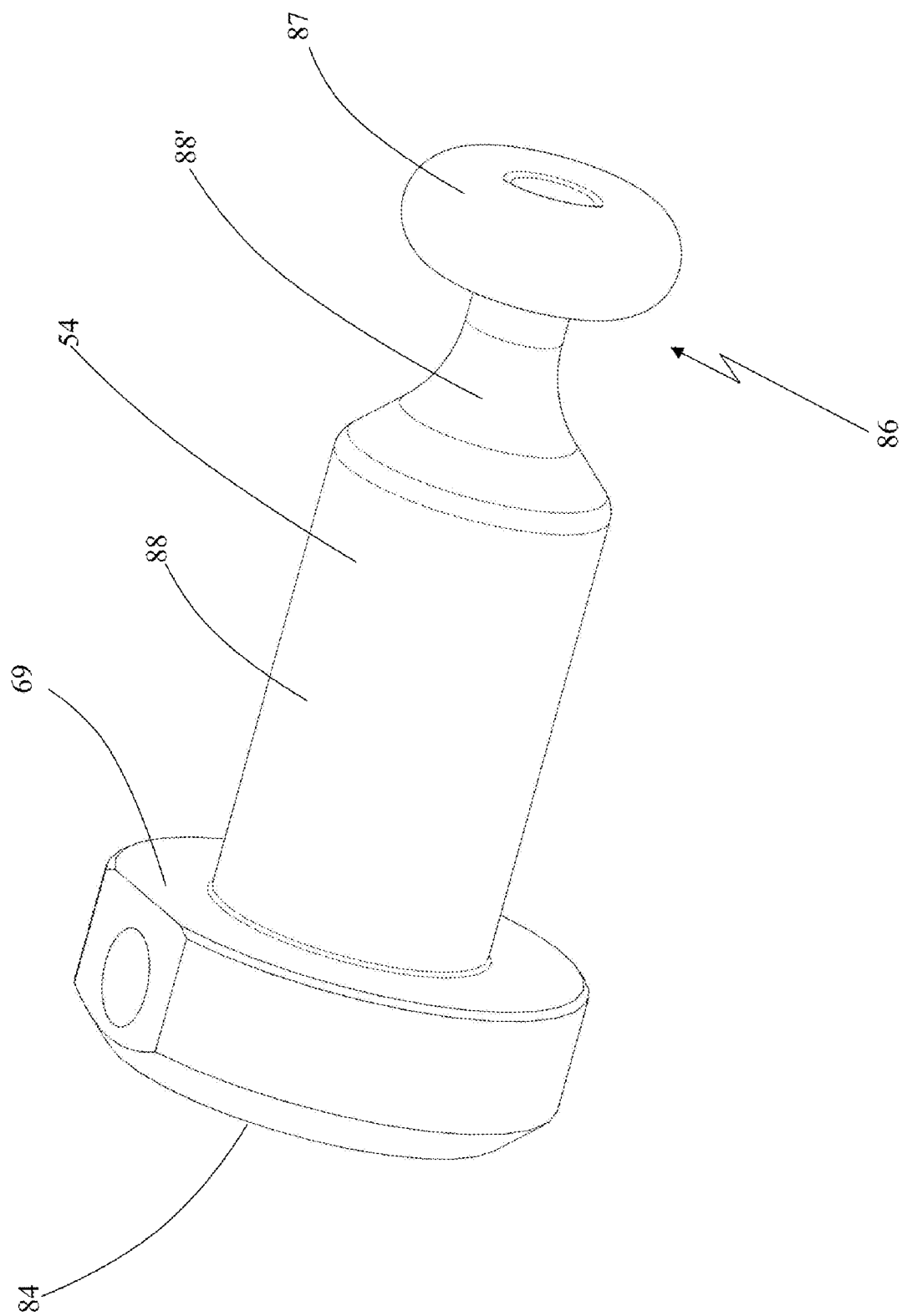
FIG. 25 shows a perspective view of a detail of the apparatus relating to an actuating element of the second grippers in accordance with the third embodiment of the invention.

With this constructional solution it is possible to integrate in a single independent assembly 160 shown in FIG. 21 the following mechanical components: the second arms 46 of the second grippers 44; the second actuating element 54; the second resilient means; the second box-shaped body 64; the second cam follower 57 of the second actuator means 48. This simplifies further the operations of mounting and removing the second grippers 44 both during assembly of the apparatus 1 and during maintenance thereof. In particular, with reference to FIG. 19, the second turntable 41 comprises a single disc 58 on which the second grippers 44 are mounted. This disc 58 is provided with a plurality of shaped openings 89 which, in number, are equal to the number of second grippers 44, the function of which is clarified hereinbelow. In detail, in order to mount each assembly 160 carrying a second gripper 44, it is merely required to pass, by means of vertical displacement, the second cam follower 57 through a first wider section 90 of the shaped opening 89 and then move horizontally the assembly 160 so as to engage a second section 91 of the shaped opening 89, which has a width smaller then diameter of the cam follower 57, with a section of the third pin 83 situated underneath the second cam follower 57. The assembly 160 is fixed to the disc 58 of the second turntable 41 and held in position by means of third screws 92 which are inserted in corresponding third through-holes formed in the disc 58 itself. During operation of the container conveying apparatus 1, the displacement of the second cam follower 57 is such as to limit the sliding movement of the third pin 83 inside the second section 91 of the shaped openings 89.

Advantageously, in accordance with all the embodiments of the second turntable 41, the second retaining portions 49 of the second arms 46 define concave oppositely facing profiles which are intended to receive and support the neck 74 of the container 2 at at least two contact points. These oppositely facing concave profiles are shaped in the manner of an envelope generated by the points of tangency with the neck 74 of the containers 2, upon variation of the diameter of their neck 74, when, obviously, the second grippers 44 are in the second closed position.

Since the neck of a container, independently of the shape of its base, always has a circular cross-section, the second retaining portions 49 of the second grippers 44 are shaped so as to retain necks with a substantially cylindrical or frustoconical shape having a diameter which is variable as per the main formats of commercially available containers.

Figures 18A, 18B, 18C:
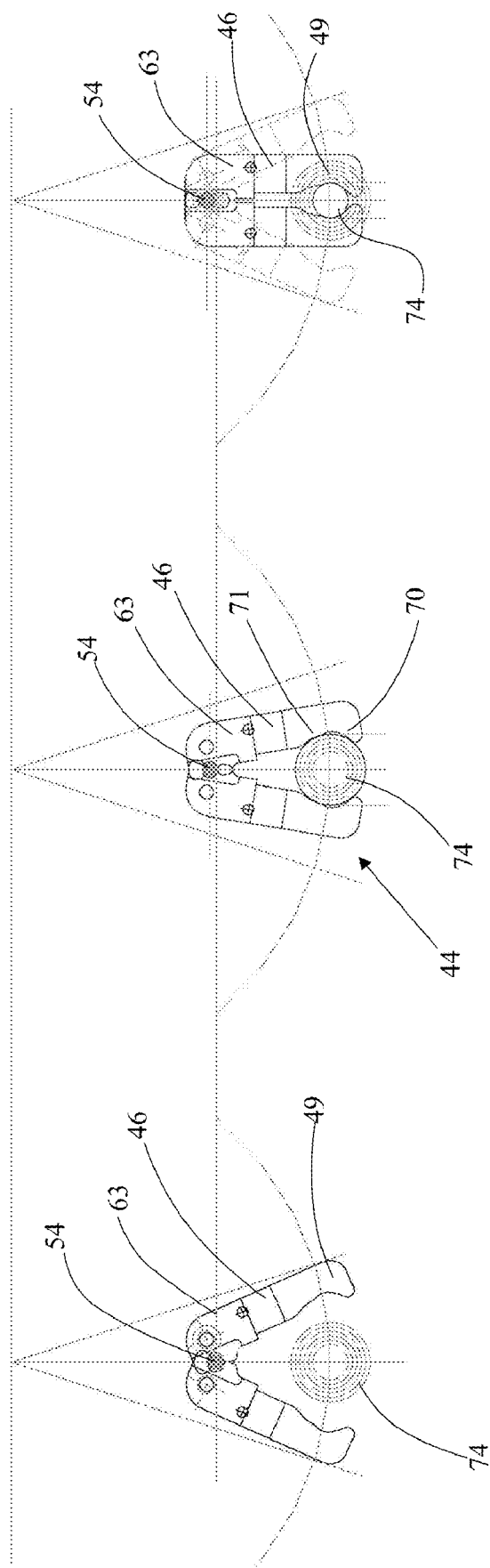
FIGS. 18a, 18b and 18c shows a second gripper mounted on the second turntable of the apparatus according to the invention with the arms in different operating positions.
Figure 19:
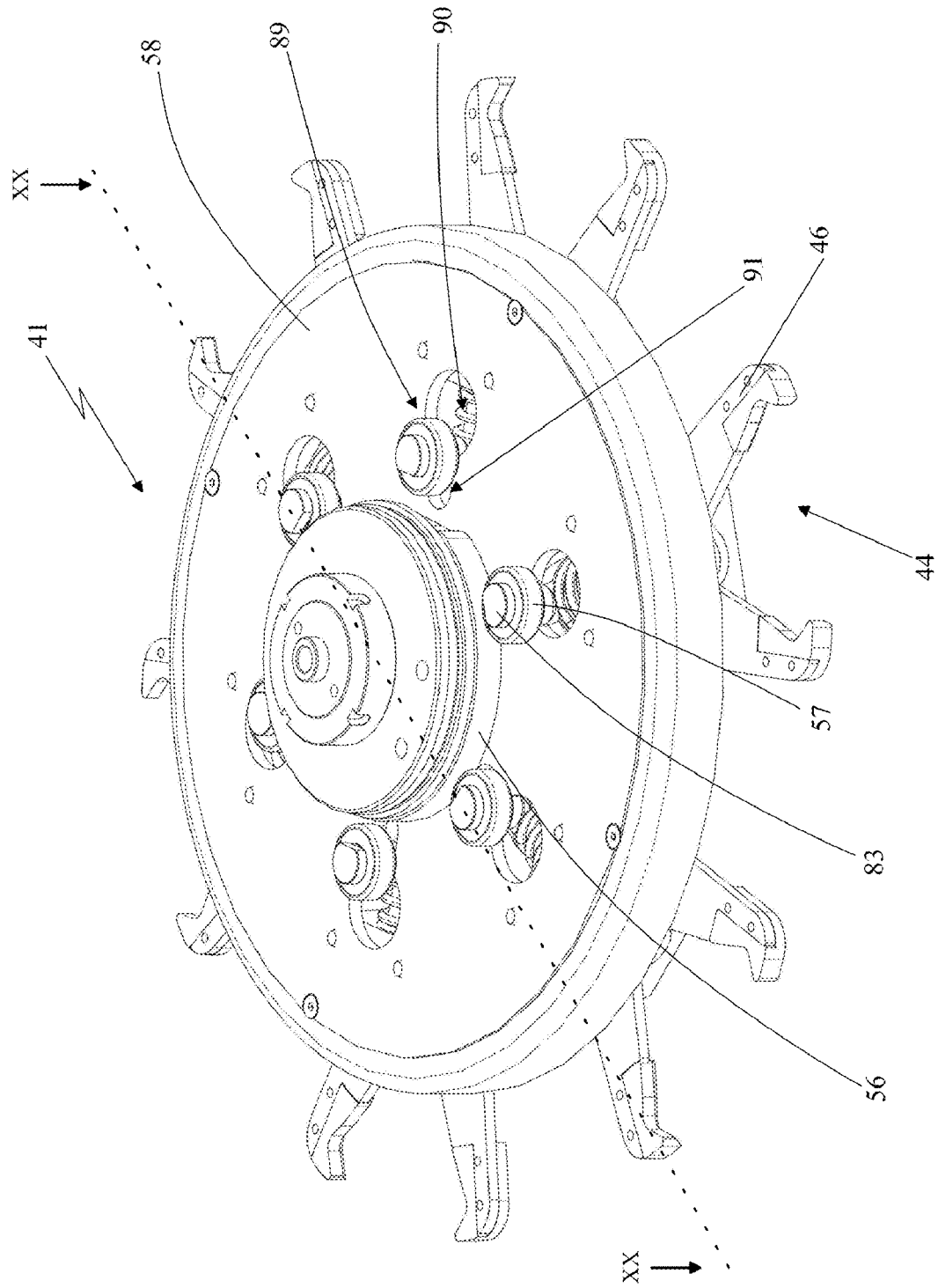
FIG. 19 shows a perspective view of a detail of the apparatus relating to the second turntable in accordance with a third embodiment of the invention.
Figure 20:
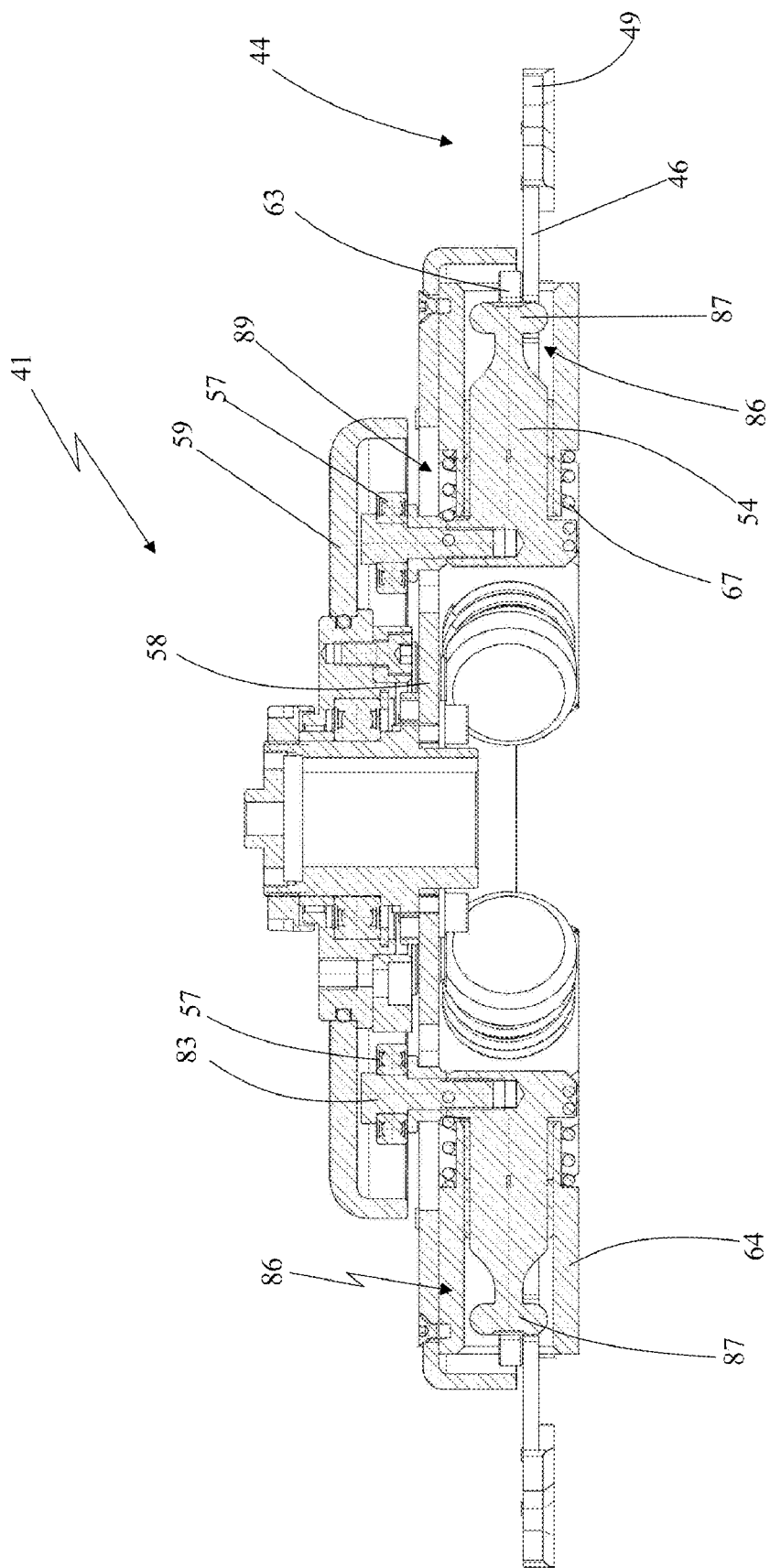
FIG. 20 shows a cross-sectional view of the second turntable shown in FIG. 19 along the line XX-XX of the same FIG. 19.

In detail, with reference to FIGS. 18a, 18b and 18c, when the second arms 46 are in the second closed position, their concave profile is arranged on either side of the convexity of the neck 74 of the container 2, making contact with the outer surface of the neck 74 in different positions, one of which is situated before and the other after the convexity by means, respectively, of a first gripping section 70 and a second gripping section 71 of the second retaining portions 49 of the second arms 46. The two gripping sections 70, 71 of the said second arms are separated from each other by a recessed part 72, as can be seen in FIG. 21.

Usefully, the second retaining portions 49 are lined with plastic or provided with rubber components in order to improve their grip with the neck 74 of the containers 2.

In the example shown in FIG. 18b, the second gripper 44 is arranged with its second arms 46 closed so as to retain the neck 74 of a container 2 with a relatively large diameter (for example 40 millimeters). The container is retained between the second retaining portions 49, making contact with two different contact points on the latter, in particular a first contact point is situated on the first gripping section 70, while a second contact point is situated on the second gripping section 71. These sections are within reasonable limits always tangential to the necks 74 of the containers 2, even when there is a variation in dimensions of the latter, so as to exert on these necks 74 forces which are always directed towards the same centre O and therefore so as to position the containers 2 with the mouth of their necks 74 always aligned with this centre O (corresponding for example to the position of the head of an operating machine).

In the example shown in FIG. 18c, the second gripper 44 is arranged so as to retain a container 2 with a particularly narrow neck 74 (for example, diameter of 20 millimeters). In this extreme situation, the neck 74 of the container 2 rests with its convex perimetral section against the depression 72 which embraces partially this perimetral section, ensuring a good retaining action and correct centring.

The invention thus described therefore achieves the predefined objects.

Obviously, it may assume, during its practical realization, also forms and configurations different from that illustrated above, without thereby departing from the present scope of protection. Moreover, all the details may be replaced by technically equivalent elements and the forms, dimensions, and materials used may be of any nature according to requirements.

The invention claimed is:

1. Apparatus (1) for transferring containers comprising:
    a support structure (4, 61);
    at least one first drive shaft (5) rotatably supported by said support structure (4, 61), extending along a vertical axis (Z) and able to rotate about said vertical axis (Z);
    a first turntable (6) centrally fixed onto said first shaft (5) so as to rotate about said vertical axis (Z);
    a plurality of first grippers (7) mounted peripherally on said first turntable (6), each provided with at least two first arms (9) which can be actuated by first actuator means (12) so as to rotate about different first pins (10) with first parallel axes (Y, Y') between at least one first open position, where respective first retaining portions (13) of said first arms (9) are spaced from each other so as to receive or release a container (2), and at least one first closed position, where said first retaining portions (13) are close together so as to hold said container between them (2); characterized in that:
    each first arm (9) of each of said first grippers (7) is provided with a slot (15) aligned with the slot of at least one other first arm (9) of the same first gripper (7);
    each first arm (9) of each first gripper (7) having a projection, in a horizontal plane of lie (π), intersecting with the projection of at least said one other first arm (9) of the same first gripper (7) in the region of said aligned slots (15);
    said first arms (9) being connected to each other by means of a first actuating element (14) which is engaged in said aligned slots (15) and is moveable by said first actuator means (12) inside said aligned slots (15) so as to rotate said first arms (9) about said first pins (10) between said first open position and said first closed position.

2. Apparatus (1) for transferring containers according to claim 1, characterized in that the first retaining portions (13) of said first arms (9) are provided with:
    at least one first projecting section (18) formed in the vicinity of a free end (16) of said first arms (9),
    at least one second projecting section (19) formed between said first projecting section (18) and said slot (15),
    said first (18) and second (19) projecting sections defining between them at least one, in particular flat, depressed section (20);
said first (18) and second (19) projecting sections and said depressed section (20) being able to receive and support said container (2) when said first arms (9) are in said first closed position.

3. Apparatus (1) for transferring containers according to claim 1, characterized in that each of said first grippers (7) is provided with three first arms (9); two of said first arms (9) having projections in said plane of lie (π) substantially coinciding with each other and intersecting with the protection of the other first arm (9).

4. Apparatus (1) for transferring containers according to claim 1, characterized in that said first actuator means (12) comprise a first cam (22) which is fixed on said support structure (4, 61), is coaxial with said first shaft (5) and with which a first cam follower (23) mounted on said first actuating element (14) is coupled.

5. Apparatus (1) for transferring containers according to claim 4, characterized in that it comprises first resilient means (27) able to exert a radial thrust on said actuating element (14), pressing said first cam follower (23) against the profile of said first cam (22).

6. Apparatus (1) for transferring containers according to claim 1, characterized in that it comprises:
- a second shaft (42) coaxially engaged inside said first shaft (5) and rotatably constrained thereto;
- a second turntable (41) fixed centrally onto said second shaft (42) and substantially parallel to said first turntable (6);
- a plurality of second grippers (44) mounted peripherally on said second turntable (41), each provided with at least one pair of second arms (46) which can be actuated by second actuator means (48) so as to rotate about different second pins (47) with second parallel axes between at least one second open position, where respective second retaining portions (49) of said second arms (46) are spaced from each other so as to receive or release said container (2), and at least one second closed position, where said second retaining portions (49) are close together so as to hold said container (2) between them.

7. Apparatus (1) for transferring containers according to claim 6, characterized in that it comprises regulating means (50) able to move slidably said second shaft (42) along said vertical axis (Z) so as to vary the vertical position of said second turntable (41).

8. Apparatus (1) for transferring containers according to claim 6, characterized in that each second arm (46) of each of said second grippers (44) is provided with a seat (55) which is arranged close to the respective second pin (47) and which receives, engaged therein, a second actuating element (54) radially moveable by said second actuator means (48) so as to rotate said second arms (46).

9. Apparatus (1) for transferring containers according to claim 6, characterized in that said second actuator means (48) comprise a second cam (56) which is fixed onto said support structure (4, 61), coaxially with said second shaft (42), and with which a second cam follower (57) mounted on said second actuating element (54) is coupled.

10. Apparatus for transferring containers according to claim 9, characterized in that it comprises second resilient means able to exert a radial thrust on said second actuating element (54), pressing said second cam follower (57) against the profile of said second cam (56).

11. Apparatus (1) for transferring containers according to claim 6, characterized in that the second retaining portions (49) of said second arms (46) define oppositely facing concave profiles intended to receive and support the neck (74) of said container (2) at at least two contact points; said oppositely facing concave profiles being shaped in the manner of an envelope generated by the points of tangency of said second retaining portions (49) with the neck (74) of said container (2) upon variation in the diameter of said neck (74), when said second grippers (44) are in said second closed position.

* * * * *